US009817658B2

(12) United States Patent
Whitcomb et al.

(10) Patent No.: US 9,817,658 B2
(45) Date of Patent: *Nov. 14, 2017

(54) ELASTIC APPLICATION FRAMEWORK FOR DEPLOYING SOFTWARE

(71) Applicant: Amazon Technologies, Inc., Reno, NV (US)

(72) Inventors: Thomas William Whitcomb, Sherman Oaks, CA (US); Sumit Lohia, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/580,057

(22) Filed: Dec. 22, 2014

(65) Prior Publication Data

US 2015/0106787 A1  Apr. 16, 2015

Related U.S. Application Data

(63) Continuation of application No. 12/328,974, filed on Dec. 5, 2008, now Pat. No. 8,918,761.

(51) Int. Cl.
*G06F 9/44* (2006.01)
*G06F 9/50* (2006.01)
*H04L 12/24* (2006.01)

(52) U.S. Cl.
CPC ............... *G06F 8/71* (2013.01); *G06F 9/505* (2013.01); *G06F 2209/501* (2013.01); *G06F 2209/549* (2013.01); *H04L 41/0213* (2013.01)

(58) Field of Classification Search
CPC .............................................. G06F 8/60–8/77

USPC .................................................. 717/168–178
See application file for complete search history.

(56) References Cited

U.S. PATENT DOCUMENTS

| | | | |
|---|---|---|---|
| 6,128,279 A | 10/2000 | O'Neil et al. | |
| 6,256,675 B1 | 7/2001 | Rabinovich | |
| 6,292,822 B1 * | 9/2001 | Hardwick | G06F 8/451 |
| | | | 718/102 |
| 6,327,630 B1 * | 12/2001 | Carroll | G06F 9/542 |
| | | | 370/412 |
| 6,341,303 B1 * | 1/2002 | Rhee | G06F 9/4881 |
| | | | 710/240 |

(Continued)

OTHER PUBLICATIONS

Gravelle, "An Introduction to JavaScript Object Notation (JSON)," Jul. 30, 2008, www.webreference.com.

(Continued)

*Primary Examiner* — Francisco Aponte
(74) *Attorney, Agent, or Firm* — Hogan Lovells US LLP

(57) ABSTRACT

Software is deployed to, and executed at, one or more computing devices in a computing system based on current conditions in the computing system and the capabilities of the different computing devices to handle the software. A request to run a software process calls a manager which determines an optimal place to run the software process. The manager can consider factors such as response time, user demands, bandwidth, processor utilization, storage utilization, security considerations, compatibility considerations and cost. Once a computing device is selected to run the software process, the manager facilitates movement of code and/or data to the computing device.

20 Claims, 18 Drawing Sheets

(56) References Cited

U.S. PATENT DOCUMENTS

| | | | |
|---|---|---|---|
| 6,353,616 B1* | 3/2002 | Elwalid | H04L 47/2408 370/389 |
| 6,401,238 B1* | 6/2002 | Brown | G06F 8/61 709/224 |
| 6,408,277 B1* | 6/2002 | Nelken | G06F 9/4881 705/7.15 |
| 6,466,980 B1 | 10/2002 | Lumelsky | |
| 6,728,961 B1* | 4/2004 | Velasco | 718/105 |
| 6,751,612 B1* | 6/2004 | Schuetze | G06F 17/30864 707/709 |
| 6,766,980 B1 | 7/2004 | Greenston | |
| 6,868,448 B1 | 3/2005 | Gupta et al. | |
| 7,069,553 B2* | 6/2006 | Narayanaswamy | G06F 8/61 717/173 |
| 7,099,915 B1* | 8/2006 | Tenereillo | H04L 67/1008 709/203 |
| 7,107,589 B1 | 9/2006 | Tal et al. | |
| 7,185,067 B1* | 2/2007 | Viswanath | H04W 28/08 455/453 |
| 7,213,038 B2* | 5/2007 | Midgley | G06F 17/30067 707/610 |
| 7,376,743 B1* | 5/2008 | Bazzinotti | H04L 12/4641 370/236 |
| 7,383,231 B2 | 6/2008 | Gupta | |
| 7,392,510 B1 | 6/2008 | Treder | |
| 7,430,610 B2 | 9/2008 | Pace et al. | |
| 7,577,731 B2* | 8/2009 | Frey | H04N 1/00957 709/223 |
| 7,747,720 B2* | 6/2010 | Toebes | H04L 67/1021 370/401 |
| 7,756,968 B1* | 7/2010 | Frey | G06F 11/3466 709/223 |
| 7,792,989 B2* | 9/2010 | Toebes | H04L 67/1021 709/223 |
| 7,941,521 B1* | 5/2011 | Petrov | H04L 41/0233 709/217 |
| 8,156,217 B2* | 4/2012 | Ramamoorthy | H04L 67/1008 709/224 |
| 8,166,152 B1* | 4/2012 | Delcheva | G06F 11/302 707/634 |
| 8,214,826 B2* | 7/2012 | Larcombe | H04L 41/022 717/177 |
| 8,407,685 B2* | 3/2013 | Clark | G06F 9/445 709/224 |
| 8,719,815 B1* | 5/2014 | Park | G06F 8/61 717/174 |
| 8,898,256 B2* | 11/2014 | Uthe | G06F 8/65 220/221 |
| 9,043,781 B2* | 5/2015 | McCarthy | G06F 8/61 717/172 |
| 2002/0178254 A1 | 11/2002 | Brittenham | |
| 2002/0178262 A1* | 11/2002 | Bonnell | G06F 9/5083 709/225 |
| 2002/0188610 A1* | 12/2002 | Spencer, Jr. | G06F 17/30893 |
| 2003/0163807 A1* | 8/2003 | Drake | G06F 8/61 717/174 |
| 2003/0204842 A1 | 10/2003 | Chenelle et al. | |
| 2005/0021759 A1 | 1/2005 | Gupta | |
| 2005/0027846 A1 | 2/2005 | Wolfe et al. | |
| 2005/0289538 A1 | 12/2005 | Black-Ziegelbein | |
| 2006/0047813 A1* | 3/2006 | Aggarwal | H04L 67/1008 709/226 |
| 2006/0248522 A1 | 11/2006 | Lakshminarayanan et al. | |
| 2007/0150595 A1 | 6/2007 | Bhorania et al. | |
| 2007/0239987 A1 | 10/2007 | Hoole | |
| 2007/0240126 A1* | 10/2007 | Allen | G06F 9/5011 717/130 |
| 2007/0240160 A1* | 10/2007 | Paterson-Jones et al. | 718/104 |
| 2007/0271560 A1* | 11/2007 | Wahlert | G06F 8/61 718/1 |
| 2007/0276940 A1* | 11/2007 | Abraham et al. | 709/224 |
| 2008/0028394 A1 | 1/2008 | Stich et al. | |
| 2008/0040455 A1 | 2/2008 | Macleod | |
| 2008/0127196 A1 | 5/2008 | Barsness et al. | |
| 2008/0306798 A1* | 12/2008 | Anke | G06F 8/61 705/7.26 |
| 2009/0064165 A1* | 3/2009 | Arimilli | G06F 9/522 718/105 |
| 2009/0064166 A1* | 3/2009 | Arimilli | G06F 9/522 718/105 |
| 2009/0064168 A1* | 3/2009 | Arimilli | G06F 9/522 718/105 |
| 2009/0164635 A1 | 6/2009 | Denker et al. | |
| 2009/0288079 A1 | 11/2009 | Zuber et al. | |
| 2010/0110890 A1* | 5/2010 | Rainer | H04M 15/00 370/232 |

OTHER PUBLICATIONS

Hunlock, Mastering JSON (JavaScript Object Notation), 2007, http://www.hunlock.com.

Java BluePrints, Model-View-Controller, Sep. 26, 2008, http://java.sun.com/blueprints/patterns/MVC-detailed.html.

* cited by examiner

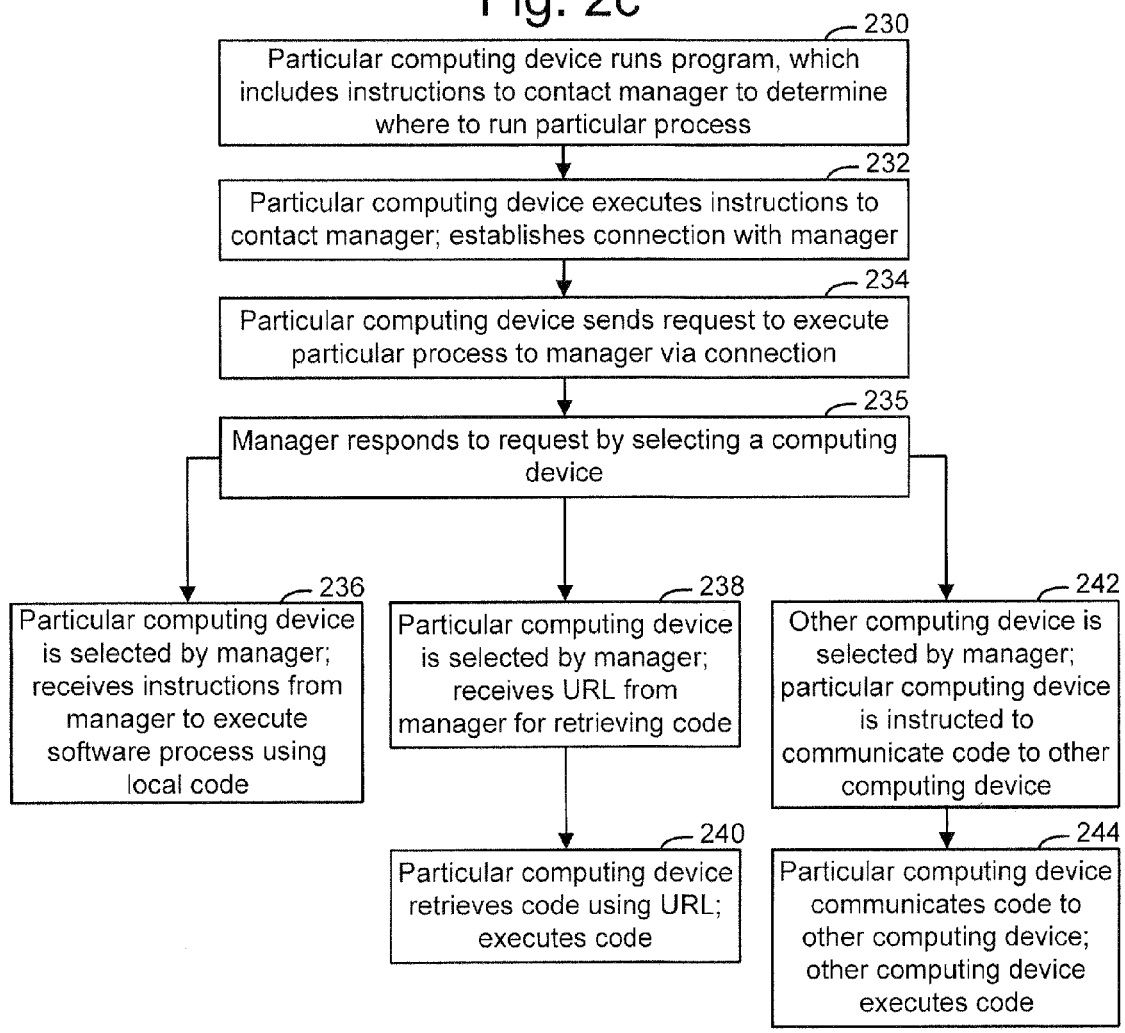

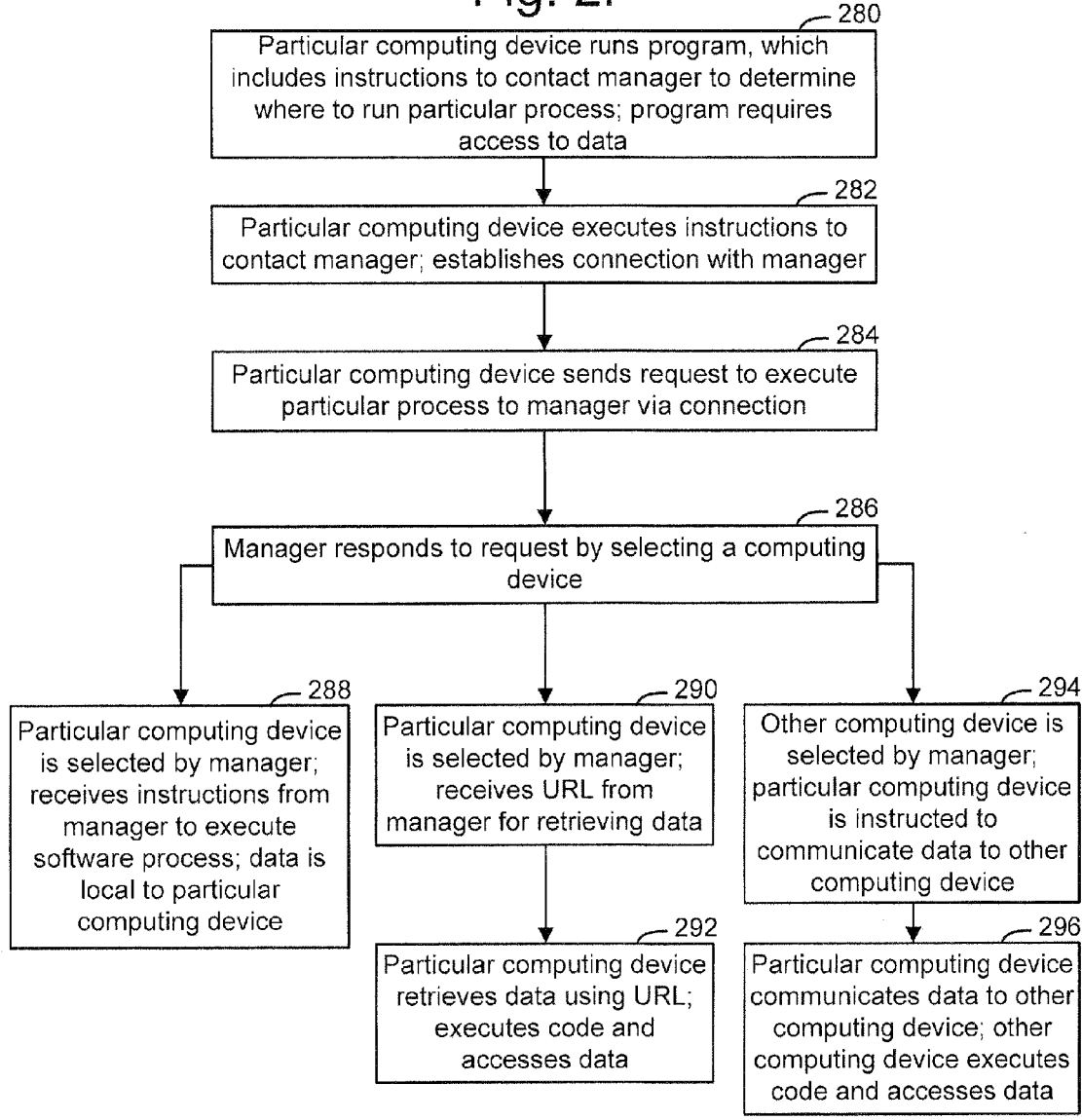

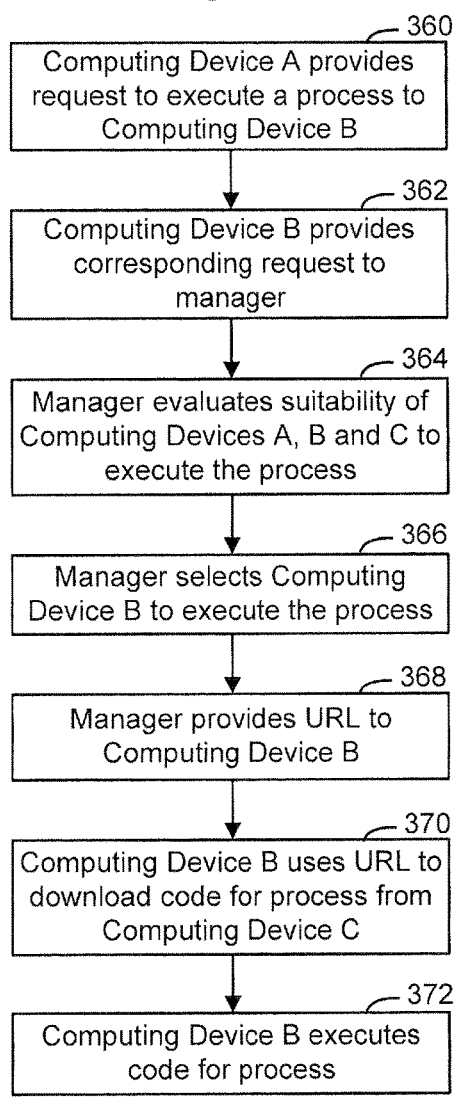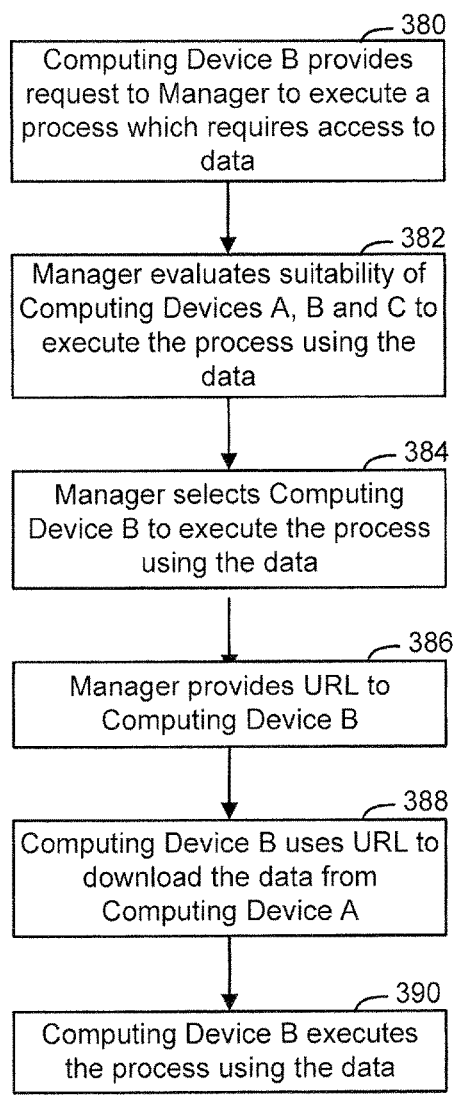

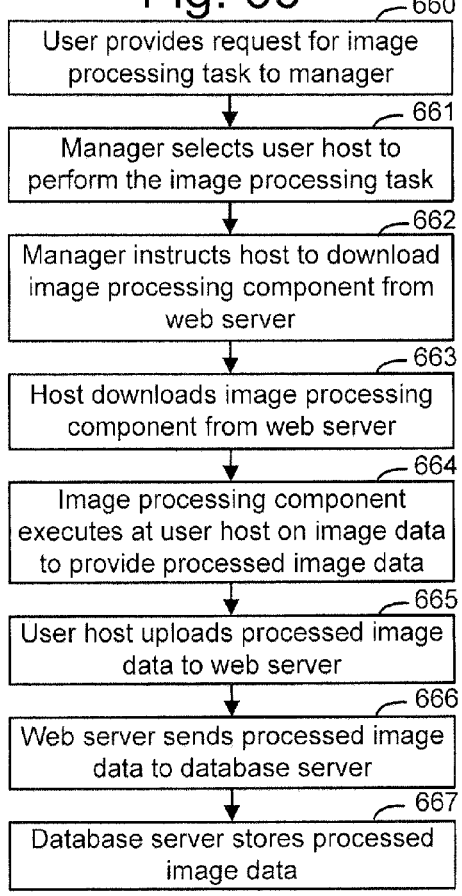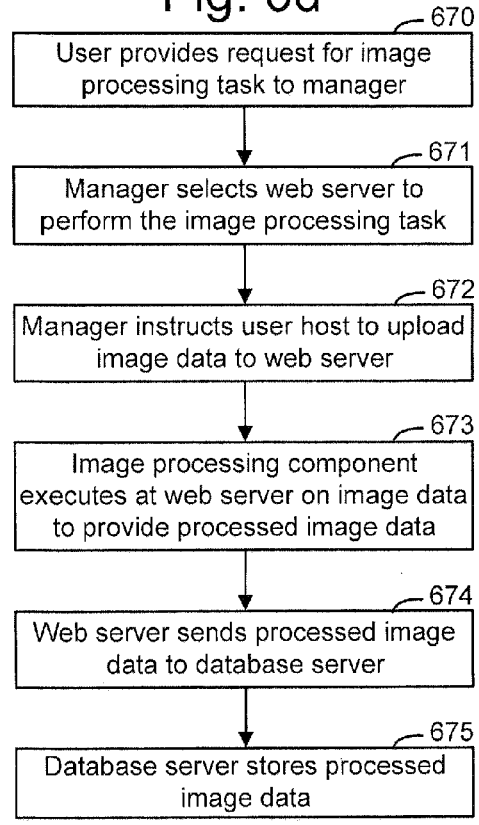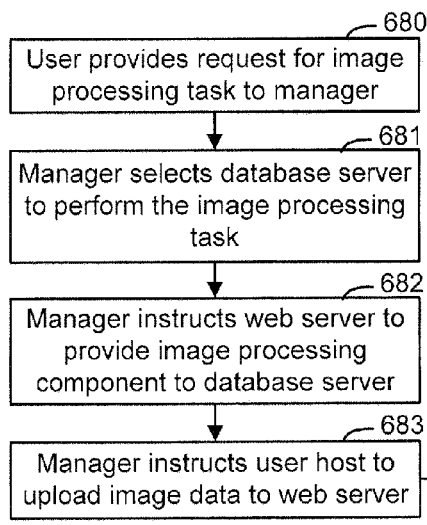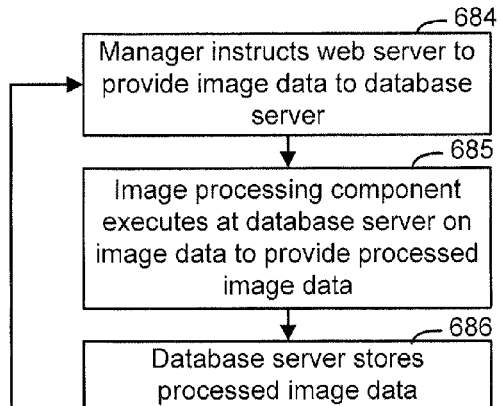

ELASTIC APPLICATION FRAMEWORK FOR DEPLOYING SOFTWARE

CROSS REFERENCE TO RELATED APPLICATIONS

This application is a Continuation of U.S. patent application Ser. No. 12/328,974, entitled "Elastic Application Framework for Deploying Software," filed with the U.S. Patent and Trademark Office on Dec. 5, 2008, and issuing as U.S. Pat. No. 8,918,761, which is incorporated herein by reference for all purposes.

BACKGROUND

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The growing presence of the Internet as well as other computer networks such as intranets and extranets has brought many new applications in e-commerce, education and other areas. Each computing device in the distributed computing environment has its own resources, such as processing and storage resources, as well as the ability to communicate with other computing devices. Computing devices can include servers, workstations, desktop computers, laptop computers, personal digital assistants (PDAs), other hand held computing devices, cell phones and so forth. Further, each computing device is typically configured with software for carrying out specific tasks. Based on the number of users, network availability and other factors, the distributed computing environment may or may not be able to meet the demands which are made of it.

In particular, the demands which are placed on a distributed computing environment are dynamic in nature, and can vary in different aspects. For example, a particular computing device on which software is executing may be in high demand. In such cases, it is possible to provision additional computing devices with copies of the software to improve the availability of the software. For example, data centers typically have many servers which run multiple copies or instances of the same software. Further, in some cases, software runs at a particular computing device, and data is maintained at a particular computing device, based on convention, lack of portability or compatibility, or proprietary interests of the software provider or network administrator. As a result, the available resources in a distributed computing network are not optimally allocated based on current conditions in the network.

BRIEF DESCRIPTION OF THE DRAWINGS

FIG. 2c depicts a detailed flowchart of a computing device-side process, as a counterpart to the manager-side process of FIGS. 1d and 2b.

FIG. 2f depicts a detailed flowchart of computing device-side process, as a counterpart to the manager-side process of FIGS. 2d and 2e.

FIG. 3c depicts a flowchart of a process involving movement of software which corresponds to the computing system of FIG. 3a.

FIG. 3d depicts a flowchart of a process involving movement of data which corresponds to the computing system of FIG. 3b.

FIG. 4b depicts a system diagram of a seventh embodiment of a computing system in which software components for processing data from a database are moved between computing devices, as an alternative to FIG. 4a.

FIG. 6c depicts a flowchart of a process for managing movement and execution of image processing components and image data, corresponding to a first distribution of components in the computing systems of FIGS. 6a and 6b.

FIG. 6d depicts a flowchart of a process for managing movement and execution of image processing components and image data, corresponding to a second distribution of components in the computing systems of FIGS. 6a and 6b.

FIG. 6e depicts a flowchart of a process for managing movement and execution of image processing components and image data, corresponding to a third distribution of components in the computing systems of FIGS. 6a and 6b.

FIG. 7b depicts a system diagram of the computing system of FIG. 7a, in which a user host has an email client and an email status component, as an alternative to FIG. 7a.

DETAILED DESCRIPTION

Technology is provided for managing a distributed computing environment to optimize the use of resources based on current conditions. Software can be deployed and executed at one or more computing devices in a computing system based on various factors such as response time, user demands, bandwidth, processor utilization, storage utilization, security considerations, compatibility considerations and cost. Further, data which is accessed by the software can similarly be optimally deployed in the computing system. Initial and subsequent deployments of software and data can be made in response to changing conditions in the computing system, including changes in the capabilities of the different computing devices.

For example, a particular computing device may provide a request to a manager to execute a software process, such as a process in an application or other program. In response, the manager evaluates the suitability of a number of candidate computing devices to execute the software. The candidate computing devices can include the requesting computing device and other computing devices. For example, the requesting computing device may be a web server which receives a corresponding request from a user device which runs a browser program. The candidate computing devices can include, e.g., the user device, the web server and perhaps a database server or application server. If the user device is selected, the manager instructs it to execute code to perform the software process, if the code is already at the user device. If necessary, the manager can locate code at another computing device and coordinate the movement of the code to the user device, e.g., using network communication protocols. If a computing device which does not already have the software is selected to execute the software, the manager may instruct the selected computing device to obtain and execute the code, such as by providing a Uniform Resource Locator (URL) from which the selected computing device can download the code. Or, the manager may instruct another computing device to send the code to the selected computing device. The code which is moved can be an entire program or a portion of a program. Moreover, portions of a program may be distributed on different computing devices so that the different portions communicate to implement the overall program.

Figure 1A:
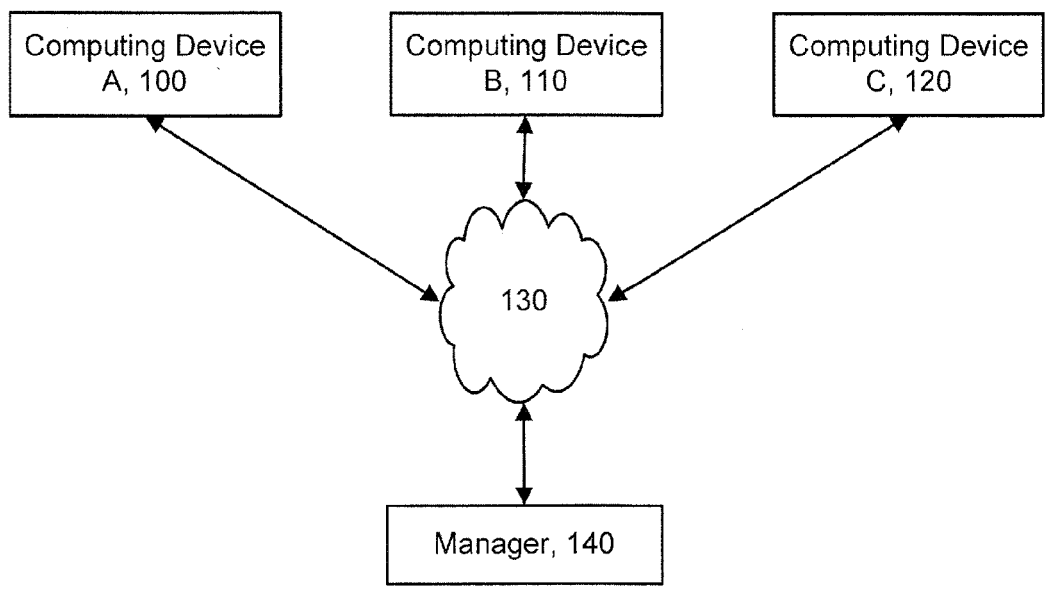
FIG. 1a depicts a high-level system diagram of a first embodiment of a computing system which includes a manager and different managed computing devices.
Figure 1B:
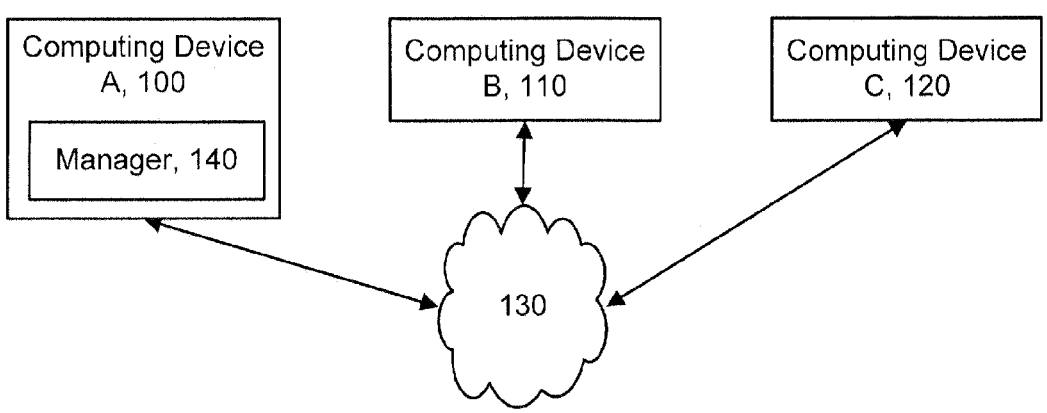
FIG. 1b depicts a high-level system diagram of a second embodiment of a computing system which includes a manager at a managed computing device.
Figure 1C:
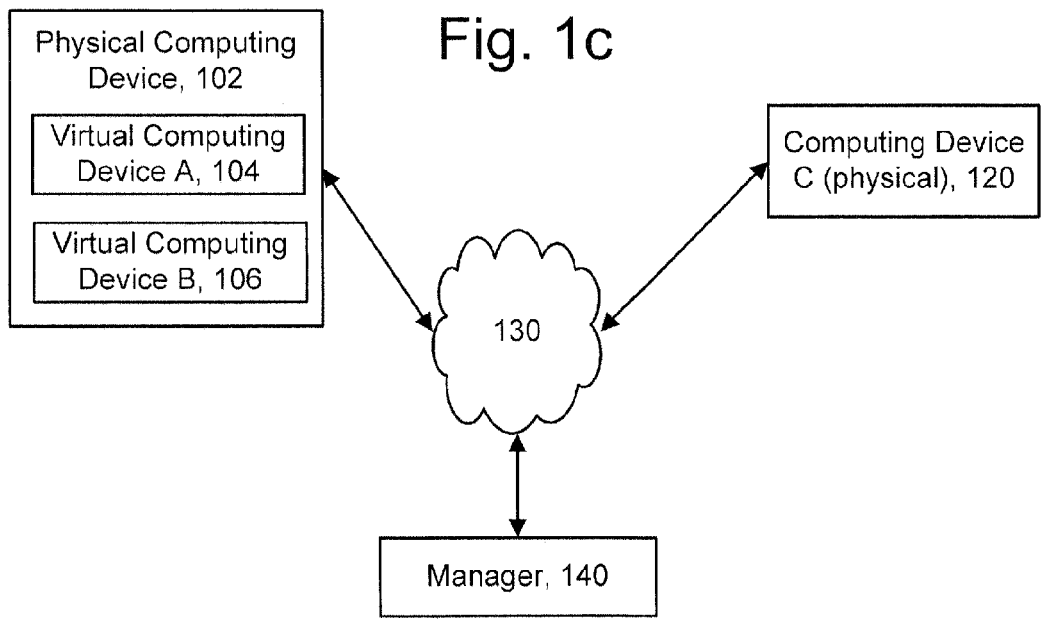
FIG. 1c depicts a high-level system diagram of a third embodiment of a computing system in which a physical computing device includes different virtual computing devices.

To illustrate various aspects of managing a distributed computing environment, FIGS. 1a, 1b and 1c are provided. These figures provide different high-level embodiments of a computing system which includes a manager and different managed computing devices, in which the movement of software and data among the computing devices is managed. They set out possible architectures in which management techniques discussed herein can be implemented. However, other architectures can be used as well.

In particular, FIG. 1a depicts a high-level system diagram of a first embodiment of a computing system which includes a manager and different managed computing devices. The computing system provides a distributed computing environment and includes a number of example computing devices such as Computing Device A 100, Computing Device B 110 and Computing Device C 120 which can communicate with one another and with a manager 140 via a network 130. A computing device may be a virtual or physical computing machine. A virtual computing machine is a distinct logical computing system, and can span one or more physical resources such as storage and processing resources. A physical computing machine can be any physical computing device, such as a server, workstation, desktop computer, laptop computer, personal digital assistant (PDA), palm top computer, other hand held computing device, cell phone or the like. Moreover, a physical computing machine can be provided as part of a larger system, such as in a control circuit of an industrial, residential or vehicular device. For instance, home networks are becoming increasing prevalent in which devices such as security systems, appliances, and entertainment devices such as televisions and set-top boxes, communicate via a network. Physical computing machines can also be found in electronics systems of automobiles and other vehicles, for instance, such as in navigation systems.

The network 130 can include the Internet, an intranet, a virtual private network (VPN), a local area network (LAN), a wide area network (WAN), a private or public network or the like, and any type of transmission media, including wired and wireless. Further, one or more networks may be used to interconnect the computing devices and the manager. The manager 140 provides a managing process for managing software which is executed by the computing devices. The manager 140 may be provided on a physical or virtual computing device which is separate from, or combined with, one of the computing devices which is managed. For example, FIG. 1b depicts a second embodiment of a computing system in which the manager 140 is provided at Computing Device A 100. Like-numbered elements correspond to one another in the figures.

FIG. 1c depicts a third embodiment of a computing system in which a physical computing device 102 includes Virtual Computing Devices A and B, 104 and 106, respectively, which correspond to Computing Devices A and B, 100 and 110, respectively of FIG. 1a. In this example configuration, Computing Device C 120 is a physical computing device.

Note that the manager and computing devices can communicate using any desired communication scheme, including connection-oriented protocols such as Transmission Control Protocol (TCP)/Internet Protocol (IP), and connectionless protocols such as User Datagram Protocol (UDP). Appropriate schemas can be used to identify the information which is exchanged.

Further, code which is executed in the computing system can include script instructions such as JAVASCRIPT (ECMA-262), in one possible implementation. Script code is advantageous as it allows code such as byte code to be portable so that it can be executed at different platforms. Script code also has the ability to call other script code on demand. Script code can be executed or interpreted without the need for compiling. JAVASCRIPT is a scripting language commonly used in web sites as client-side script, such as when embedded in HTML web pages, but it enables scripting access to objects embedded in other applications as well. Other example scripting languages include JSCRIPT of MICROSOFT CORP. and PHP (www.php.net).

Moreover, the code which is executed in the computing system can include distinct components. Many common software development patterns involve separating software into distinct components. For example, the model-view-controller (MVC) pattern separates objects into one of three categories: models for maintaining data, views for displaying all or a portion of the data, and controllers for handling events that affect the model or view(s). Because of this separation, multiple views and controllers can interface with the same model. Also, new types of views and controllers that never existed before can interface with a model without forcing a change in the model design. In a specific example, the model components can include business logic, view components which manage a user interface and controller components which manage a network and messaging.

Further, the separable components can also be portable so that they can be used with different operating systems and hardware platforms. For instance, the use of a scripting language such as JAVASCRIPT can provide such portability. JAVASCRIPT can be stored in files, similar to non-code data, so that it can be easily accessed when needed. Further, as mentioned, JAVASCRIPT can be interpreted so that it can be quickly executed without being compiled. JAVASCRIPT has become ubiquitous, and can be invoked from many different programming languages, including JAVA, RUBY and many others. JAVASCRIPT has typically been used in web pages so that when a web page is sent from a web server to a browser, the browser loads the web page and executes the JAVASCRIPT. JAVASCRIPT can also be used in cell phones, home appliances, vehicle electronics and other applications. The techniques provided herein extend the traditional concept of moving JAVASCRIPT to, and executing it at, a browser so that it can be moved to, and executed at, essentially any type of computing device. Further, intelligence is added by a managing process to determine an optimal location to execute the code.

JAVASCRIPT has become an essentially platform independent language. An application or other program can be defined in JAVASCRIPT in separable pieces that can run on different computing machines and communicate through existing Internet technologies such as by using URLs and IP addresses. The manager provides a management framework in which the processing landscape can be adjusted so that processing occurs at optimal locations in a computing system based on various factors. Further, the manager can provide a learning system by sensing conditions in a network and automatically moving code and data around in an optimum configuration that reduces costs and enhances the user experience. The computing devices on which the code and/or data is moved can be on the same or different physical computing devices.

Additionally, in one possible implementation, the computing devices, including the manager, can communicate code, data, instructions or other information using a lightweight computer data interchange format such as JAVASCRIPT OBJECT NOTATION (JSON), which is a text-based, human-readable format for representing simple data structures and associative arrays. Further, communications between software components can use JSON. JSON is described in Request for Comments: 4627, Network Working Group, JSON.org, July 2006. The JSON format is often used for transmitting structured data over a network connection in a process called serialization. It can serve as an alternative to the use of the XML format to describe data formats. JSON is streamable across the Internet and is both a programming language and a structure for data, whereas XML is a structure for data but not a programming language, and therefore has to be converted into a target language. JSON does not need to be converted because it is a programming language. However, XML is suitable in many cases. Although JSON was based on a subset of the JAVASCRIPT programming language (specifically, Standard ECMA-262 3rd Edition—December 1999) and is commonly used with that language, it is considered to be a language-independent data format. Code for parsing and generating JSON data is readily available for a large variety of programming languages.

JSON is JAVASCRIPT code that represents a data structure. JSON can represent four primitive data types (strings, numbers, Booleans, and null) and two structured types (objects and arrays). A string is a sequence of zero or more Unicode characters. An object is an unordered collection of zero or more name/value pairs, where a name is a string and a value is a string, number, Boolean, null, object, or array. An array is an ordered sequence of zero or more values, where the value can be a JSON primitive or an object or array. An object is an unordered set of key:value pairs. The key is a string and the value, as with the array, can be a JSON primitive, object, or array. Thus, JSON is suitable for representing text data and meta data rather than binary data.

Many rich applications can use JSON or XML. For example, an email application may have buttons or other devices that change dynamically, such as to provide a count of new email messages. Such dynamic features can be realized, e.g., using asynchronous JavaScript and XML (AJAX), which is a group of interrelated web development techniques used for creating interactive web applications or rich Internet applications. With AJAX, web applications can retrieve data from a server asynchronously in the background without interfering with the display and behavior of the existing page. The browser and web server may communicate using raw HTML or JSON.

Figure 1D:
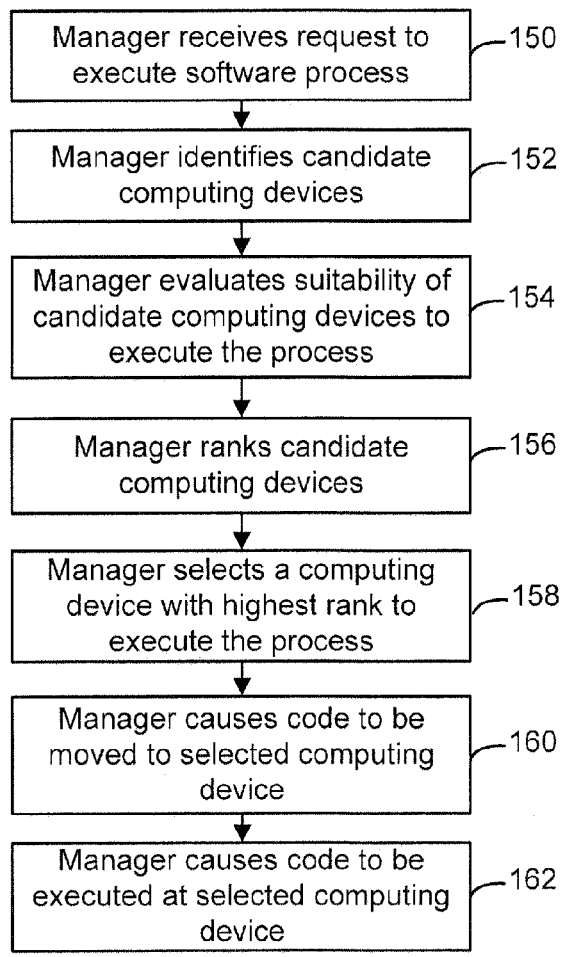
FIG. 1d depicts a high-level flowchart of a process in which a manager selects an appropriate computing device to execute software in a computing system which may be based on the first through third embodiments of FIGS. 1a-1c.

To illustrate a process which can be performed in the computing systems of FIGS. 1a, 1b and 1c, FIG. 1d is provided. FIG. 1d depicts a high-level flowchart of a process in which a manager selects an appropriate computing device to execute software in a computing system which may be based on the first through third embodiments of FIGS. 1a-1c. The manager may be configured with hardware and/or software to manage software in the computing system, including managing movement and execution of software and data based on one or more conditions.

Computing devices are typically manually configured with software such as applications or other programs. For example, software can be installed in a computing device when it is manufactured, when it is initially placed into service and/or after it has been in service. The installation may be performed by a user or network administrator, for instance. In some cases, the software requires access to a data store such as a database which may be local to the computing device, such as in a hard drive or semiconductor non-volatile memory of the computing device, or in another nearby computing device connected as a peripheral, for instance, via a network. Or, the data store can be remote from the computing device, such as at a database server across a network. Moreover, while a computing device includes some level of internal processing and storage resources, it may also access external processing and storage resources, such as in a virtual computing/storage network, in a technique referred to as cloud computing. Cloud computing allows users to access technology-enabled services from the Internet without necessarily having knowledge of, expertise with, or control over the technology infrastructure that supports the services.

A virtual computing/storage network is typically a private network which includes a substantial amount of processing and storage resources which can be allocated as needed to a computing device outside the network, typically, but not always, via a web interface on the computing device. Data is permanently stored in servers in the virtual computing/storage network and cached temporarily on a client computing device such as when the computing device requests access to the data.

In an example process for managing software, manager 140 receives a request to execute a software process, at block 150. For example, the request may be made by or from one of the computing devices. In one scenario, the software process is not currently being performed in the distributed computing environment when the request is made. For example, the request may be made on behalf of a client browser. The client browser may provide a request to a web server to "add an item to shopping cart" in an e-commerce application. In response, the web server may communicate with the manager, informing the manager that the client has provided this request, but the web server does not know where to execute it. In this case, the web server rather than the client is configured with software for contacting the manager. This software would be specific to the implementation, but could include information such as where to locate the manager (such as an IP address), what protocol to use to contact the manager (such as TCP/IP) and what call to make to the manager. The call could provide a client identifier (such as IP address), client capabilities (such as operating system, types of media supported, browser version, presence or absence of security certificates, and whether client can run JavaScript or other script), an identification of the software process which is requested (such as specified by the URL used by the client to contact the web server), and a request to instruct the web server as to where the software process should execute. The web server may obtain the client's information when it connects to the web server. For instance, the HTTP "Accept" request-header field can be used by the client to specify certain media types which are acceptable to the client.

At block 152, the manager identifies one or more candidate computing devices. For example, the candidate computing devices may be devices which are known to be accessible and currently available via a network, and which are authorized to execute the process. For instance, in a private network, the identity of each computing device, such as an identifier and a network address of a network interface card of each computing device, can be obtained by the manager by broadcasting a request for the computing devices to identify themselves to the manager, e.g., in a network discovery process. The identity of a computing device which makes the request to execute the software process, such as its network address, can similarly be provided to the manager as identifying information in a communication to the manager according to various network communication protocols such as HTTP. A network address may include a public or private Internet Protocol (IP) address, for instance. It is also possible for the requesting computing device to identify other computing devices to the manager. For instance, the requesting computing device may identify other computing devices with which it currently has a connection or previously had a connection, or with which it has otherwise been in communication, such as via a connectionless protocol. For instance, a client computing device may identify an associated server computing device, and a server computing device may identify an associated client computing device.

In a scenario where a client such as a browser provides a request to a server, and the server provides a corresponding request to the manager, the request can identify the client, and the manager can identify the web server via a Domain Name System (DNS) lookup. For example, the web server may be behind a load balancer, in which case the manager can access a DNS server to communicate with any server behind the load balancer. Further, a database server which is in communication with the web server may be identified via a configuration file or DNS lookup, for instance.

Moreover, the manager could use a network directory service such as Universal Description, Discovery and Integration (UDDI) to locate candidate computing devices to execute the software process. UDDI is a platform-independent, XML-based registry for businesses to publish listings and discover each other. A directory service can provide a list of client and their capabilities so that the manager can identify candidate clients based on a specific needed capability.

At block 154, the manager evaluates the suitability of the candidate computing devices to execute the process based on one or more conditions, or criteria, discussed further below. The suitability or appropriateness of a computing device to execute a process can be based on various factors as detailed further below. These can include factors which do not change with time, such as the processing power of a computing device, as well as factors which do change with time, such as the current load on a computing device. The manager can obtain information for making this evaluation in various ways. For example, the computing devices may periodically report data to the manager via respective agent processes at the computing devices, where the data indicates the suitability of the computing devices to handle a process. Additionally, or alternatively, the manager may query the computing devices to obtain the desired data. The manager may also obtain data from entities other than the candidate computing device to ascertain the abilities of the candidate devices. For example, a router in the same private network as a candidate computing device database server could report on the available bandwidth in the network. The manager may assign a score to each computing device based on the evaluation. Block 154 is detailed further below in connection with FIG. 2*a*.

At block 156, the manager ranks the candidate computing devices based on the evaluation, such as based on their score. At block 158, the manager selects one of the computing devices with the highest rank to execute the process. It is possible that more than one computing device can be selected if the process can be performed in portions (e.g., in parallel or serially). At block 160, manager 140 causes code of the software process to be moved to the selected computing device. For example, this may involve the manager instructing one computing device to communicate the code to the selected computing device, the manager itself communicating the code to the selected computing device, or the manager instructing the selected computing device to contact a computing device to request the code. Generally, the code can be at the requesting computing device, another candidate computing device, a non-candidate computing device, or the manager. The code can be stored in files and communicated using JSON or other network communication protocols.

One possible technique for moving code is to provide a URL to the selected computing device which it reads and uses to pull down the code. For example, to move code from a particular computing device to a selected computing device, the selected computing device can be provided with a URL of the particular computing device or another computing device that can be used to initiate the transfer of the code. In this case, the URL can be communicated by the particular computing device, the manager or another entity. For example, if the code is hardware platform-independent script code such as JavaScript, the code can be located at any URL, for example, http://codesource.com/js/jquery.js, and the manager can send this URL to the selected computing device with instructions to fetch the code by issuing an HTTP GET command to the URL. Block 160 is detailed further below in connection with FIG. 2b.

The manager essentially tells the selected computer to prepare to execute the software process. If the selected computer does not have code of the software process, the manager instructs it to obtain the code.

At block 162, the manager causes the code to be executed at the selected computing device, such as via an appropriate instruction to the selected computing device. Further, in the example implementation where the manager provides a URL to the selected computing device to obtain code, the code may include instructions to execute the software process. In another approach, the manager informs the requesting computing device that the selected computing device now has the code and is ready to execute the software process. The manager may provide an address or other identifier of the selected computing device to the requesting computing device. The requesting computing device, in turn, instructs the selected computing device to execute the software process. The manager thus can decide where to run the software process, prepare the selected computing device, and facilitate communication between the requesting computing device and the selected computing device. Or, in a batch type of operation, the manager can instruct the selected computing device to execute the software process. After the selected computing device executes the software process, or while it executes the software process, it may report results to a designated location such as the requesting computing device or other location.

The process of FIG. 1d for managing software can be performed automatically, without user intervention, e.g., so that it can continuously adapt to existing conditions in the network.

As an example, a program may include a software process, e.g., a component or module, which is invoked by a user at a browser, and which requires access to data at a data store at another computing device such as a database server. The manager can determine whether it is preferable for the data to be communicated from the data store to the browser, where the software process can run on the browser and access the data local to the browser, or for portable code of the software process to be communicated to the data store, where it executes and accesses the data local to the data store, and perhaps reports a result to the browser. A more detailed explanation of block 154 of the process of FIG. 1d is provided next.

Figure 2A:
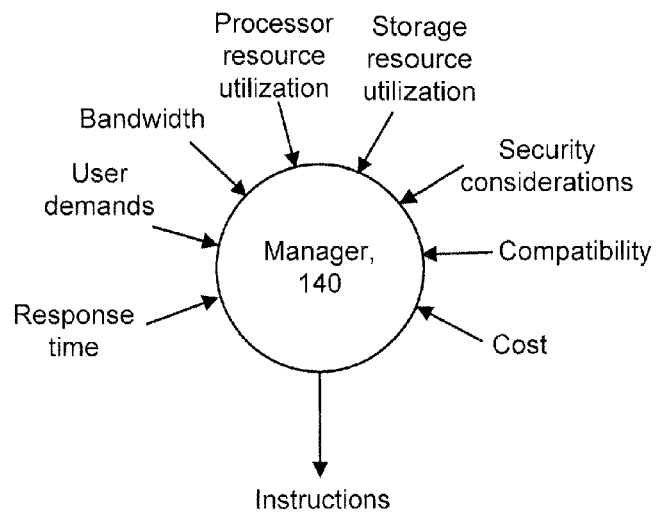
FIG. 2a depicts details of block 154 of FIG. 1d.

To illustrate details of block 154 of the process of FIG. 1d, FIG. 2a is provided. FIG. 2a depicts details of block 154 of FIG. 1d. Various conditions can be considered by the manager 140 of FIGS. 1a-1c to evaluate the suitability of candidate computing devices to perform a software process. For example, FIG. 2a shows manager 140 providing instructions as to where a software process should be executed based on one or more of response time, user demands, bandwidth, processor utilization, storage utilization, security considerations, compatibility considerations and cost.

The response time is a time required by a computing device to respond to a test query from another computing device. For example, a particular computing device may periodically send a request to other computing devices, calculate the elapsed time until a response is received, and report the response time to the manager. The manager can store the response time for subsequent decision-making purposes. Or, the manager itself or another entity may send requests to the computing devices to determine their response times.

A user demand metric can include a count of user requests which have been sent to a computing device in a specified time period. Such a count can be maintained by the computing device or by an intermediary such as a gateway server which forwards such requests to the computing device. Bandwidth can represent, e.g., a data transfer rate based on the amount of data transferred to or from a computing device within a specified period. Processor resource utilization can be expressed as a percentage of CPU cycles which is utilized over a specified time period. Storage resource utilization can be expressed as a percentage of storage resources, e.g., hard drive or cache memory, which is utilized over a specified time period.

The above-mentioned conditions can further be provided using statistical measures such as an average, minimum, maximum, mean, standard deviation and so forth.

Security considerations can include information which indicates whether a computing device is trusted, whether a computing device is behind a firewall, whether a computing device uses a certain type of encryption, whether a computing device is in the public domain, and so forth. The manager can be configured with such information manually or may obtain it automatically, e.g., without user intervention. For instance, password based security or certificate based security can be used. With certificate based security, for instance, a client computing device such as a cell-phone based browser can contact a web server, and allow the web server to place a certificate on the client computing device, with user approval. When the client computing device again contacts the web server, it communicates the certificate, so that the client computing device can be recognized as a trusted device. On the other hand, if a client computing device is not recognized as being secure, it may not be considered as a candidate to execute secure code.

The manager can also rely on source IP address of a computing device to deduce firewall information (e.g., presence or absence of a firewall and type of firewall). An identifier of a type of a computing device can also provide security information. For instance, a computing device which identifies itself as a cell phone, e.g., via a connect string, may be treated as an unsecured device. Finer grained security information can be provided using a protocol such as Extensible Messaging and Presence Protocol (XMPP) to provide authentication and authorization capabilities. XMPP is an open, XML-inspired protocol originally aimed at near-real-time, extensible instant messaging (IM) and presence information (also known as buddy lists), but has been expanded into the broader realm of message oriented middleware.

Compatibility considerations indicate whether a computing device is compatible with a particular software process. For example, a certain hardware configuration, such as a processor speed and cache size, may be required to run software. Similarly, a certain software configuration, including certain types and versions of software, such as an operating system, may be required to run other software.

Cost can include a monetary cost to use a particular computing device. For example, in a virtual compute/storage network, CPU cycles and storage resources may be charged in increments such as dollars per amount of CPUs used, dollars per amount of data transferred, and so forth.

When multiple conditions are considered, equal or unequal weights can be given to the different conditions. Some conditions can be dispositive by themselves. For example, a computing device which does not meet a security requirement may not be further considered as a candidate even if it has available bandwidth. In another example, when candidate computing devices are ranked based on bandwidth, the one with the most bandwidth may be selected.

Figure 2B:
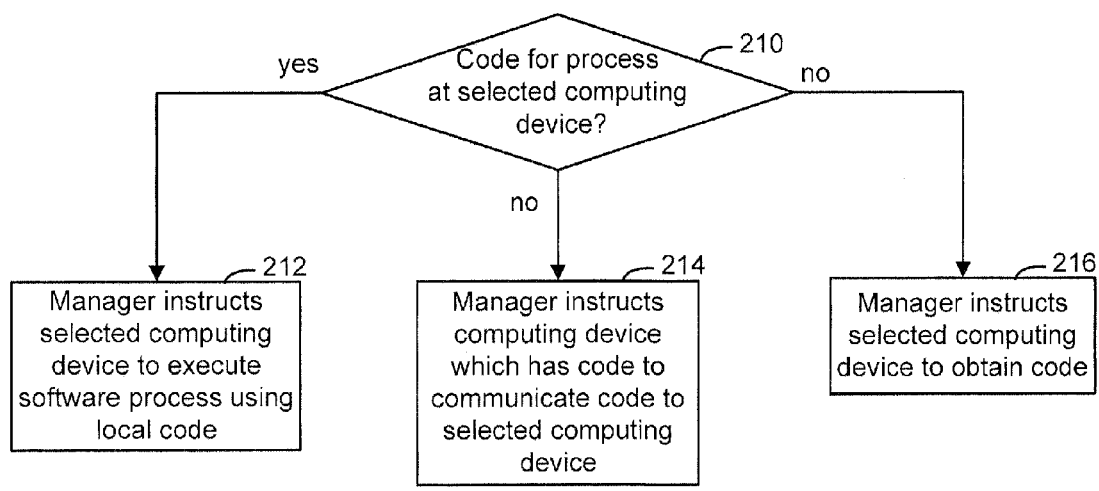
FIG. 2b depicts details of block 160 of FIG. 1d.

To illustrate details of block 160 of the process of FIG. 1*d*, FIG. 2*b* is provided. FIG. 2*b* depicts details of block 160 of FIG. 1*d*. In the manager process to move code to a selected computing device, at decision block 210, in a first option, at block 212, the code for the requested software process is at the selected computing device, in which case the manager instructs the selected computing device to execute the software process using the local code. For example, a computing device which provides a request to execute a software process, and which has the code for executing the software process, may itself be the selected computing device.

At decision block 210, in a second option, at block 214, code is not currently at the selected computing device, and the manager instruct a computing device which has the code to move the code to the selected computing device. This can be achieved using any available technique. For example, the manager can communicate a message to the computing device which includes an identifier of the selected computing device, an identifier of the code, and instructions to move the code such as via an HTTP POST command.

At decision block 210, in a third option, at block 216, if code is not currently at the selected computing device, the manager instructs the selected computing device to obtain the code. For example, the manager can communicate a message to the selected computing device which includes an identifier of another computing device and an identifier of the code, and instructions to contact the computing device to obtain the code. In a specific implementation, the manager can provide a URL to the selected computing device which can be used to access the code such as via an HTTP GET command. In another possible approach, the manager itself has the code and provides it to the selected computing device such as via an HTTP POST command.

The manager may also instruct the selected computing device to report results from executing the code to the unselected computing device, the manager, the requesting computing device or another entity. For example, the computing device which provides the request to execute the software process may execute a program, where the software process is a component of the program. When the selected computing device executes the software process, the program can run in a distributed manner on the two computing devices. Further, a software component on the selected computing device may communicate with one or more remaining components of the program on the other computing device. The different components may execute in concert as part of a common context, for example, exchanging information as needed. Or, the code which is moved to the selected computing device can execute independently.

In the above discussion of FIGS. 1*d* and 2*b*, a manager-side process for managing movement of code in a computing system was discussed. The managing can also be understood from the point of view of a managed computing device. Details of a computing device-side process for moving code are discussed next in connection with FIG. 2*c*.

FIG. 2*c* depicts a detailed flowchart of a computing device-side process, as a counterpart to the manager-side process of FIGS. 1*d* and 2*b*. At block 230, a particular computing device runs a program which includes instructions to contact a manager to determine where to run a particular process of the program. A new or existing program may be configured with such instructions. Further, note that the instructions to contact the manager may be triggered by a communication from another computing device. For example, a web server may contact the manager in response to receipt of a request from a browser with which the web server has a connection. Instructions may be provided prior to executing a component or module of a program which performs the process. At block 232, the particular computing device executes the instructions to contact the manager, such as by establishing a connection with the manager. At block 234, the particular computing device sends a request to execute the particular process to the manager via the connection. At block 235, the manager responds to the request by selecting a computing device to execute the process. Three possible options are discussed next.

In a first option, at block 236, the particular computing device is selected by the manager and receives instructions from the manager to execute the software process using local code. In a second option, at block 238, the particular computing device is selected by the manager and receives a URL from the manager for retrieving code. At block 240, the particular computing device retrieves the code using, e.g., an HTTP GET command to the URL and executes the code. Or, the particular computing device may retrieve the code and wait to receive instructions to execute it.

In a third option, at block 242, another computing device is selected by the manager and the particular computing device is instructed to communicate code to the another computing device. At block 244, the particular computing device communicates the code to the another computing device such as via an HTTP POST command and the another computing device executes the code, or waits to receive instructions to execute it.

In the above discussion of FIG. 1*d*, a focus was on a manager-side process for moving code in a computing system. However, the movement of data can be managed as well, separately or together with the movement of code. To illustrate this, a manager-side process for moving data is discussed next in FIG. 2*d*.

Figure 2D:
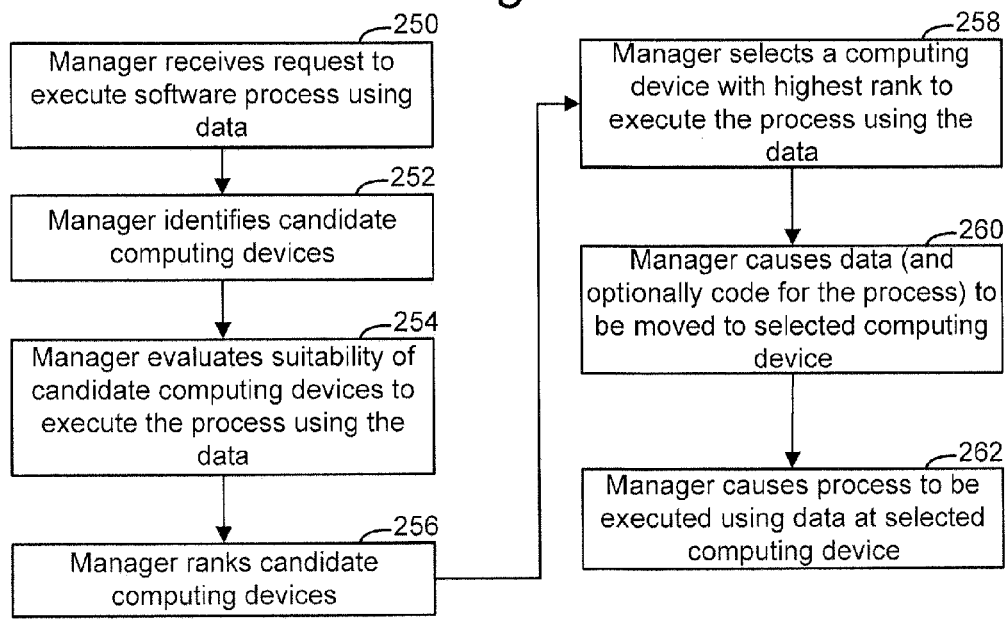
FIG. 2d depicts a high-level flowchart of a process in which a manager selects an appropriate computing device to execute software using data in a computing system which may be based on the first through third embodiments of FIGS. 1a-1c.

FIG. 2*d* depicts a high-level flowchart of a process in which a manager selects an appropriate computing device to execute software using data in a computing system which may be based on the first through third embodiments of FIGS. 1*a*-1*c*.

As mentioned, movement of both code and data can be managed. A process for moving data can be performed alone or with a process for moving code. For example, a software process may need to access data in a data store such as a data base, date file, or the like. A database may be accessed for various reasons. In some cases, a client computing device is involved in accessing data, such as to perform a process which involves manipulating the data. For example, an application used by a business might need to access salary information and job descriptions of employees in a database to prepare a report of average salary per job type. In one approach, code for performing the process is moved from the client computing device to a database server, for instance, where it executes to obtain the salary and job type for each employee, calculate the average salary per job type, and report that summary result back to the client computing device. However, in some cases it may be preferable to move the data to the code which performs the processing, or closer to such code, such as when the code which performs the processing consumes a large amount of processing and storage resources, or when it is not advisable to move the code to the database server because the database server does not meet security conditions. Although, more typically, a database server is secure while a client is not secure. In other cases, data at a database or other data store can be accessed without client involvement, such as by a process which updates data, performs garbage collection, obtains statistics about the data, and so forth.

The manager receives a request to execute a software process which involves accessing data, at block 250. The request may identify data to be accessed, such as by a URL or other network identifier. At block 252, the manager identifies one or more candidate computing devices, as discussed previously. At block 254, the manager evaluates the suitability of the candidate computing devices to execute the process using the data based on one or more conditions, as discussed previously. At block 256, the manager ranks the candidate computing devices based on the evaluation, such as based on a score. At block 258, the manager selects one of the computing devices with the highest rank to execute the process using the data. At block 260, the manager causes data, and optionally code for the process, to be moved local to the selected computing device. At block 262, the manager causes the process to be executed using the data which is local to the selected computing device. The process of FIG. 2*d* can be performed automatically, without user intervention.

Figure 2E:
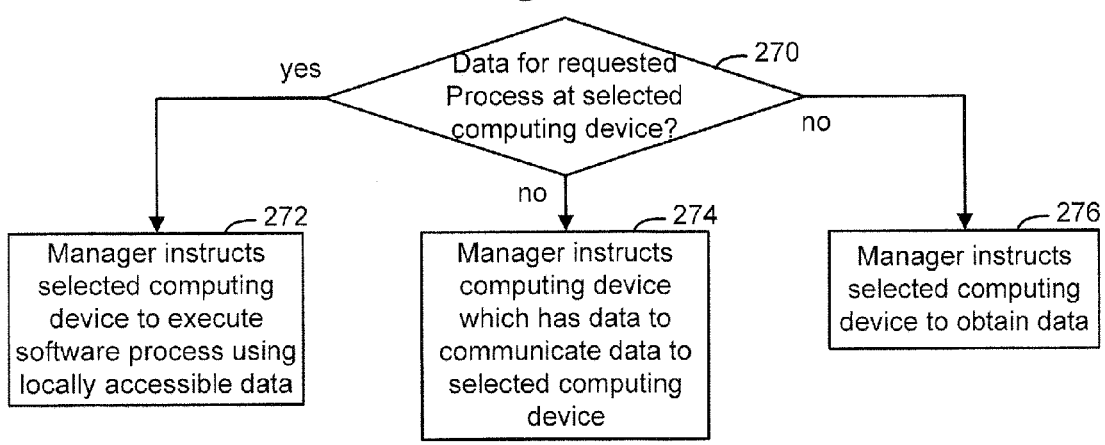
FIG. 2e depicts details of block 260 of FIG. 2d.

To illustrate details of block 260 of the process of FIG. 2*d*, FIG. 2*e* is provided.

FIG. 2*e* depicts details of block 260 of FIG. 2*d*. In the manager process to cause data to be moved local to a selected computing device, at decision block 270, a determination is made as to whether data for a requested process is at the selected computing device. In a first option, decision block 270 is true, and the manager instructs the selected computing device to execute the software process using the locally accessible data, at block 272. If decision block 270 is false, in a second option, the manager instructs a computing device which has the data to move the data to the selected computing device, at block 274, such as via an HTTP POST command. If decision block 270 is false, in a third option, the manager instructs the selected computing device to obtain the data, at block 276, such as via an HTTP GET command.

In the above discussion of FIGS. 2*d* and 2*e*, a manager-side process for managing movement of data was discussed. The managing can also be understood from the point of view of a managed computing device. Details of a related computing device-side process for moving data are discussed next in connection with FIG. 2*f*.

FIG. 2*f* depicts a detailed flowchart of computing device-side process, as a counterpart to the manager-side process of FIGS. 2*d* and 2*e*. At block 280, a particular computing device runs a program, which includes instructions to contact a manager to determine where to run a particular process of the program. Note that the instructions to contact the manager may be triggered by a communication from another computing device. At block 282, the particular computing device executes the instructions to contact the manager, including establishing a connection with the manager. At block 284, the particular computing device sends a request to execute the particular process to the manager via the connection. The request may identify data to be accessed. At block 286, the manager responds to the request by selecting a computing device. Next, three options are depicted.

In a first option, at block 288, the particular computing device is selected by the manager, and the particular computing device receives instructions from the manager to execute the software process using data which is local to the particular computing device. In a second option, at block 290, the particular computing device is selected by the manager and receives a URL from the manager for retrieving the data. In a third option, at block 294, another computing device is selected by the manager and the particular computing device is instructed by the manager to communicate the data to the another computing device. At block 296, the particular computing device communicates the data to the another computing device, and the another computing device executes the software process using the local code and the locally accessible data.

The above discussion has involved different general concepts of automatically moving code and data in a computing system, from the points of view of a managing process and a managed computing device. Next, more concrete examples of moving code and data components in specific scenarios are discussed in FIGS. 3*a* and 3*b* as illustrations of the general concepts.

Figure 3A:
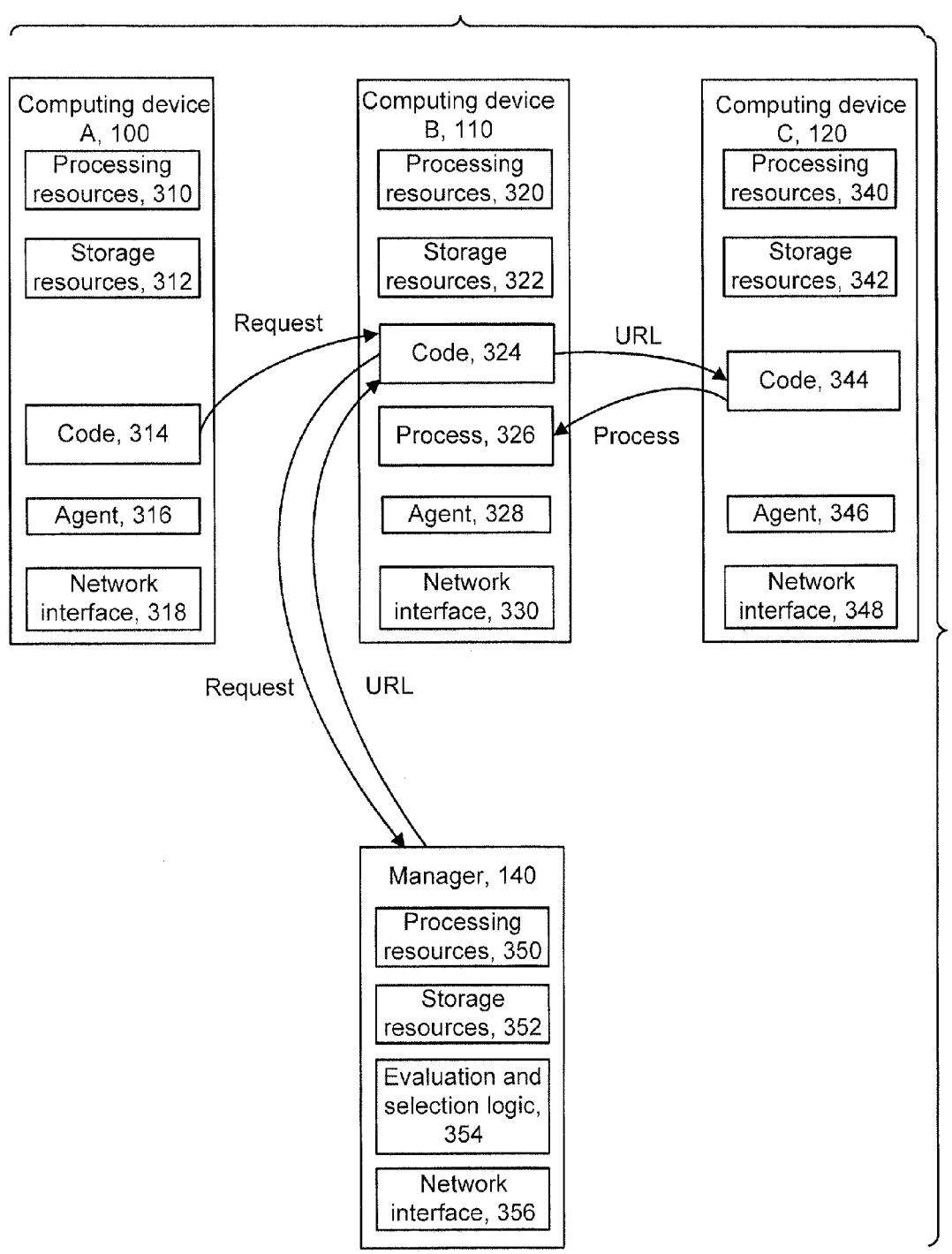
FIG. 3a depicts a system diagram of a fourth embodiment, which is based on the computing system of FIG. 1a, in which code is obtained by a second computing device under the control of a manager.
Figure 3B:
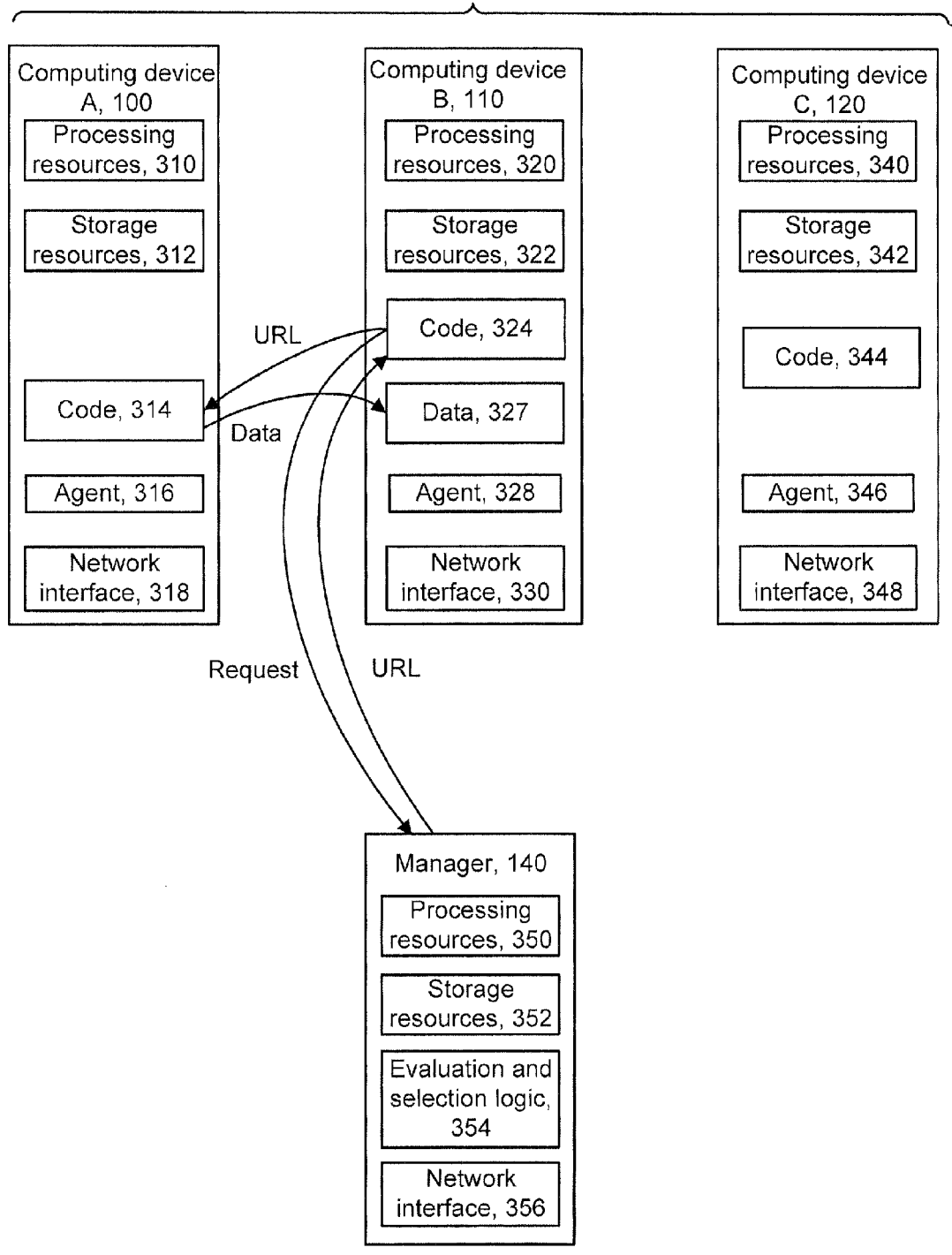
FIG. 3b depicts a system diagram of a fifth embodiment, which is based on the computing system of FIG. 1a, in which data is obtained by a second computing device under the control of a manager.

FIGS. 3*a* and 3*b* provide a specific example based on FIG. 1*a*, showing the movement of code and data between computing devices. FIGS. 3*c* and 3*d* are related flowcharts.

Specifically, FIG. 3*a* depicts a system diagram of a fourth embodiment, which is based on the computing system of FIG. 1*a*, in which code is obtained by a second computing device under the control of a manager. Computing Device A 100 includes processing resources 310, storage resources 312, code 314, an agent process 316 and a network interface 318. Computing Device B 110 similarly includes processing resources 320, storage resources 322, code 324, an agent process 328 and a network interface 330. Process 326 is initially not present at Computing Device B. Computing Device C 120 includes processing resources 340, storage resources 342, code 344, an agent process 346 and a network interface 348. The manager 140 includes processing resources 350, storage resources 352, evaluation and selection logic 354 and a network interface 356.

The processing resources may include one or more central processing units (CPUs) or processors in each computing device, while the storage resources may include resources such as hard drives and cache memory. The agent processes run on the respective computing devices to gather and report information to the manager regarding an suitability of the respective computing devices to execute a process and/or store data which is accessed by a process. The network interfaces may include network interface cards which allow network communications to take place.

Refer also to FIG. 3*c*, which depicts a flowchart of a process involving movement of code which corresponds to the computing system of FIG. 3*a*.

In this example, code 314 at Computing Device A 100 communicates a request to execute a process 326 to Computing Device B (block 360). The process 326 is initially not present at Computing Device B, as mentioned. In response to the request, Computing Device B executes its code 324 which includes instructions to provide a corresponding request to the manager 140 (block 362). In response to the request, the manager uses the evaluation and selection logic 354 to evaluate the suitability of computer devices A, B and C to execute the process (block 364), and selects Computing Device B 110 to execute the process (block 366), for instance. The manager then provides a URL to Computing Device B (block 368). In response, Computing Device B uses the URL to download a copy of the code 326 for the process from Computing Device C (block 370), where it is stored. The URL identifies the code for the process at Computing Device C. Generally, a particular computing device can retain a copy of code which it sends to another computing device so that the retained copy can be subsequently accessed or executed at the particular computing device. Computing device B executes code for process 326 at block 372.

In a further alternative, code for the process 326 can call additional code from Computing Device C or another computing device when the code executes. Generally, any executing code can call other code to be executed on the calling computing machine. For example, the code can include script instructions such as JAVASCRIPT (ECMA-262) which calls other script code on demand. When code for the process 326 is loaded at Computing Device B, the process can communicate with the manager 140 to determine if there is additional code that the process should call. The manager can respond, e.g., by providing an identifier of the additional code, such as another URL. The code for the process 326 could use the URL to contact a computing device to load and execute the additional code.

In another option, executing code can create additional code. For example, JavaScript has meta-programming capabilities, and can use anonymous functions to create functions during run time. This allows additional functionalities to be created easily based upon specific inputs. JavaScript can also create JavaScript statements as data and execute them using the eval( ) function.

FIG. 3b depicts a system diagram of a fifth embodiment, which is based on the computing system of FIG. 1a, in which data is obtained by a second computing device under the control of a manager. As mentioned, the manager 140 can manage both code and data in a computing system. In some cases, it is advantageous to move data to a computing device which has code so that the code can access the data locally. In this example, data is initially at Computing Device A.

Refer also to FIG. 3d, which depicts a flowchart of a process involving movement of data which corresponds to the computing system of FIG. 3b.

Code 324 at Computing Device B makes a request to the manager 140 to execute a process, where the request identifies the data as being required by the process (block 380). In response, the manager uses the evaluation and selection logic 354 to evaluate the suitability of Computer devices A, B and C to execute the process using the data (block 382), and selects Computing Device B 110 (block 384). The manager provides a URL to Computing Device B for accessing the data (block 386). Computing device B uses the URL to download the data 327 from Computing Device A (block 388) and Computing Device B executes the process using the data (block 390). Optionally, once execution of the process is completed, code for the process can be deleted. As before, note that it is possible for a particular computing device to retain a copy of data which it sends to another computing device so that the retained data can be accessed at the particular computing device as well as at another computing device.

The above discussion has illustrated moving specific code and data components in a computing system. However, the code and data components were not explained as being part of a specific program or application. To provide a further illustration, examples are presented next in FIGS. 4a and 4b involving moving code which is part of an application which involves accessing a database.

Figure 4A:
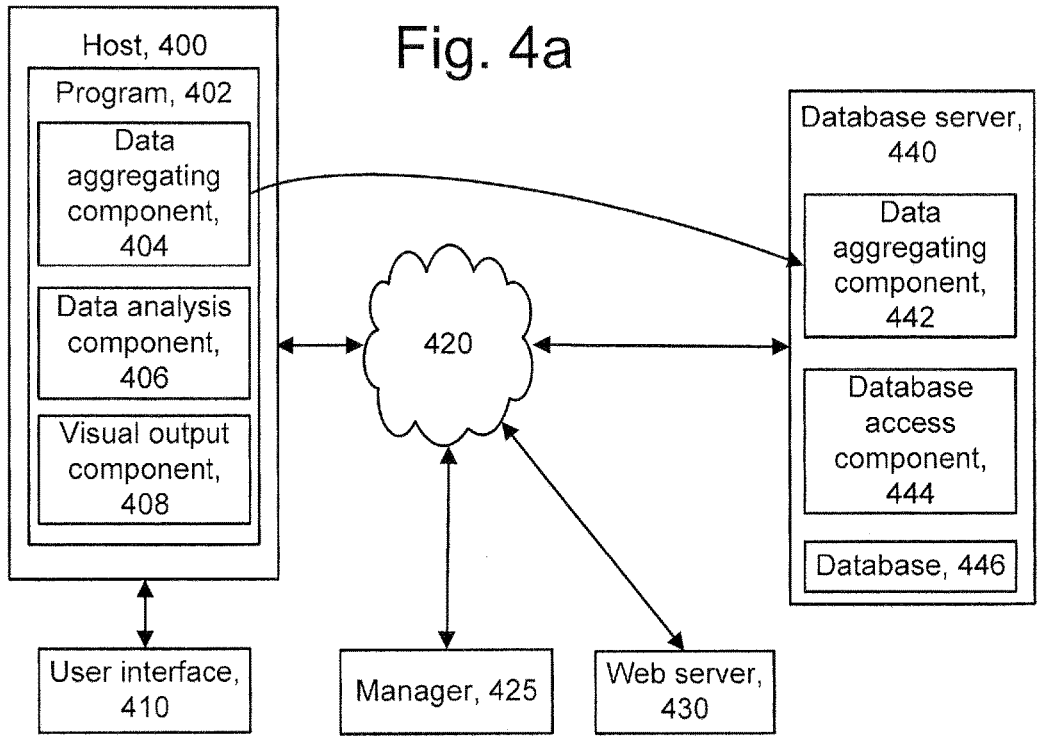
FIG. 4a depicts a system diagram of a sixth embodiment of a computing system in which software components for processing data from a database are moved between computing devices.
Figure 4B:
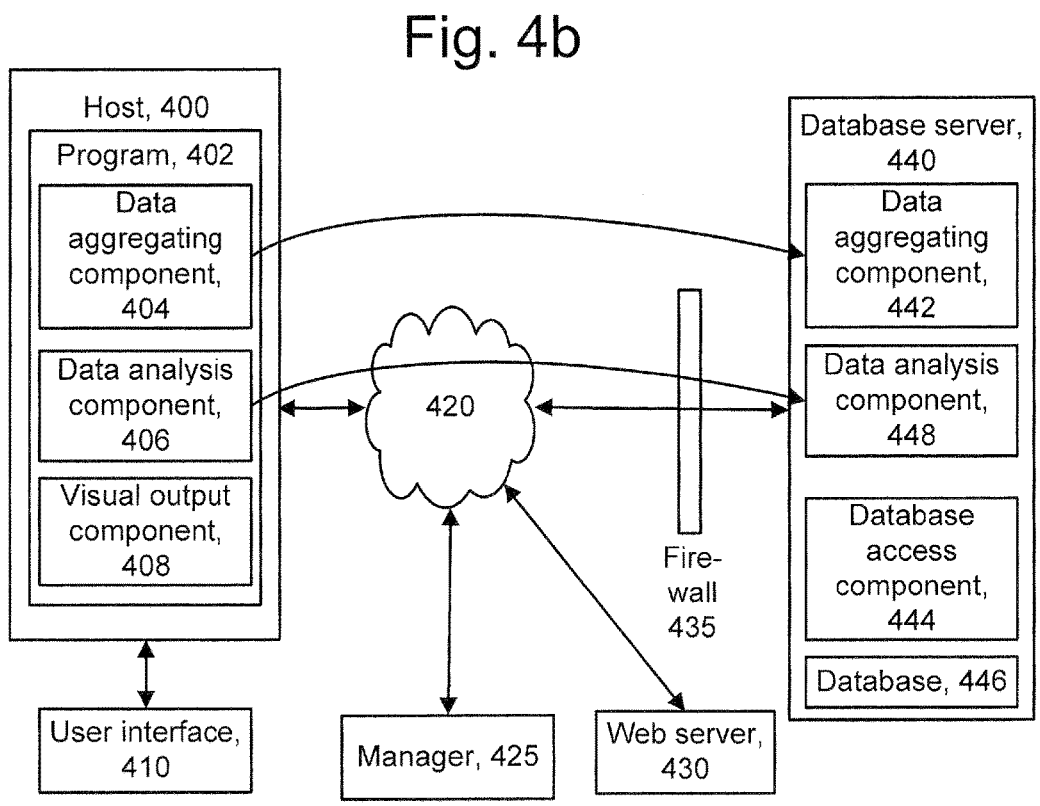
Figure 4C:
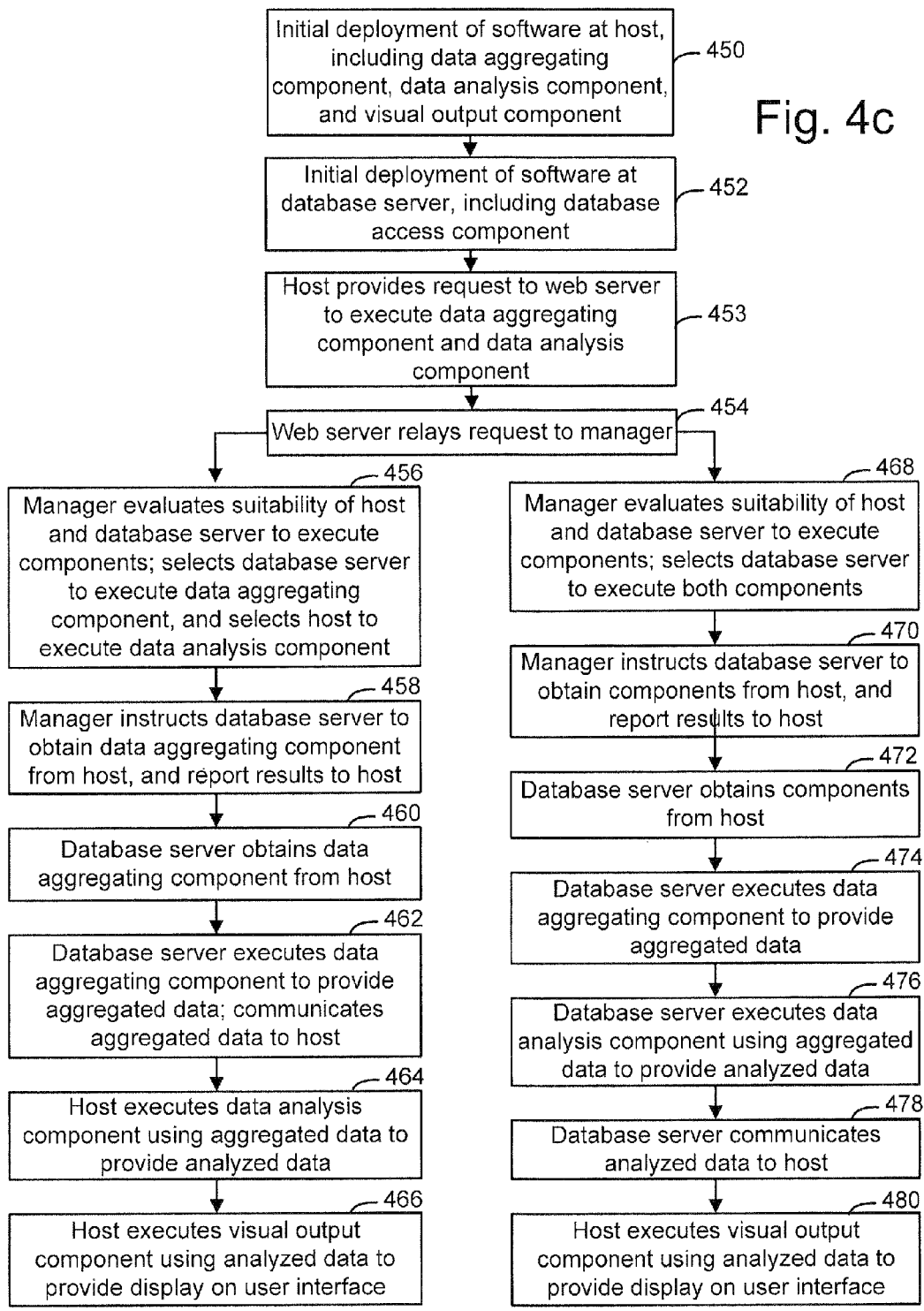
FIG. 4c depicts a flowchart of a process for managing movement and execution of software components which corresponds to the computing systems of FIGS. 4a and 4b.

FIGS. 4a and 4b provide another specific example, showing code which accesses a database, and the movement of code between computing devices. FIG. 4c is a related flowchart.

Specifically, FIG. 4a depicts a system diagram of a sixth embodiment of a computing system in which software components for processing data from a database are moved between computing devices. This example involves a host 400 which has a program 402, including a data aggregating component 404, a data analysis component 406, and a visual output component 408. The program 402 requires access to a data store such as a database 446 which is at a database server 440. A program may need to access a database for various reasons, such as to update the database with new data or to obtain data from the database. As mentioned previously, in some cases, a program which accesses a database does not necessarily involve a client computing device. Such a program can perform garbage collection, obtain statistics about the data, and so forth. In other cases, a program which accesses a database does involve a client computing device. For example, a client program may access data to provide a report to a user of the client program. In one example implementation, a client program is used by a business to access a database which has employee related data, such as salary and job type, to prepare a report which indicates average salary per job type over time, for instance.

In this example, the data aggregating component 404 may obtain all the salary and job type data for each employee and provide aggregated or summary data such as average salary per job type for each month of the year. The data analysis component 406 may process the aggregated data, such as to provide statistical measures, e.g., average change in salary, and standard deviation of salary distributions over the employee population. The output of the data analysis component 406, referred to as analyzed data, may be provided to a visual output component 408 such as to provide charts, graphs and other visual output to a user interface 410, e.g., which includes a screen and user input/output devices such as a keyboard and pointing device.

The database server 440 initially includes a database access component 444 which is used to access data from the database 446, e.g., using appropriate low level commands such as Structured Query Language (SQL) commands. A network 420 allows the host 400 and the database server 440 to communicate. Additionally, a manager 425 and a web server 430 may be provided. The host 400 may connect to the database server 440 and/or manager 425 directly or via the web server 430, for instance.

The program 402 makes a request to execute the data aggregating component 404. This request may be made to the web server 430 via an HTTP connection which has been established between the host 400 and the web server 430, for instance. The web server 430 provides a corresponding request to the manager 425 to ask it where the data aggregating component 404 should be executed. The manager evaluates the request and determines that the database server 440 should execute the data aggregating component 404. The manager 425 instructs the database server to obtain a copy of the data aggregating component 442 from the host. Or, the manager 425 can instruct the web server to obtain a copy of the data aggregating component 442 from the host 400 and provide it to the database server 440. Typically, the host and the database server communicate via the web server. The host 400 can use an HTTP POST command to the web server 430 to provide the component. Further, the data aggregating component 404 may include instructions for reporting a result of the aggregating, such as aggregated data, back to the program 402 at the host 400 or to another location.

An example of a JSON format for reporting the results is as follows. Assume the results from the database include average salary per job type, for each of last three years.

```
{ "year1" : { "job type 1" : "50k", "job type 2" : "60k", "job type 3" : "70k" },
  "year2" : { "job type 1" ; "52k", "job type 2" : "65k", "job type 3" : "78k" },
  "year3" : { "job type 1" : "54k", "job type 2" : "67k", "job type 3" : "82k" }
}.
```

Executing the data aggregating component 442 at the database server 440 can be advantageous as it avoids the need to communicate raw data from the database to the host 400 for access at the host. In particular, when very large amounts of data are stored in one or more databases or other data stores, moving the code to the data rather than moving the data to the code can significantly reduce processing time.

Moreover, the code which requires access to data can be moved to a computing device which is local to the data, including on the same computing device which stores the data, or another computing device. For example, in FIG. 4*a*, the database server 440 stores the data and is local to the data. However, the web server 430 or some other computing device may have access to the database server 440 and the data in the database 446. For instance, the web server 430 may be in the same private network as the database server or otherwise be local to the database server 440, for instance, such that communication between the web server and the database server is expedient. A component such as the data aggregating component 442 could thus be moved from the host 400 to the web server 430, where it executes and accesses the database 446. Data transfer from the database 446 to the web server 430 is also possible, such as when there is sufficient network bandwidth.

The program 402 is considered to be broken apart or stretched, as if is was elastic, and its components distributed and executed at different locations based on business needs and infrastructure availability. This distribution can take place before or during a runtime of the program 402. Moreover, the program does not need to know where each of its components is as long as the individual components communicate with one another as needed.

FIG. 4*b* depicts a system diagram of a seventh embodiment of a computing system in which software components for processing data from a database are moved between computing devices, as an alternative to FIG. 4*a*. In this scenario, the database server 440 is behind a firewall 435 and therefore has a higher level of security. Due to this higher level of security, the manager 425 may decide that the database server should execute both the data aggregating component and the data analysis component. The manager thus instructs the database server to obtain a copy of the data aggregating component 442 and a copy of the data analysis component 448 from the host. For instance, there may be a business reason to avoid moving the database analysis component 448 to a non-secure location. The database analysis component 448 might have proprietary information which could be obtained by unauthorized means, or may be subject to attacks if it were not run behind the firewall 435. The database analysis component 448 is an example of a separable component of business logic that can run in a specified location based on security considerations.

On the other hand, the host 400 could be behind a firewall (not shown), in which case it may be desired to keep a sensitive component such as the data analysis component 406, for instance, at the host 400 for security reasons.

Generally, different portions of a program can be separated out so that they can run in different locations based on various conditions. Regarding the example of security considerations, it may be desired to prevent certain software components from executing in the public domain. For example, it may be desired to separate out business logic components and run them in a secure location such as behind a firewall. On the other hand, it may be acceptable for components which provide a visual aspect, for instance, to run in the public domain. In one approach, one or more components which provide a core processing state can be provided on a secure side of a firewall while other components are deployed beyond the firewall to process some information that is located in a database, and report results back to the core processing state.

FIG. 4*c* depicts a flowchart of a process for managing movement and execution of software components which corresponds to the computing systems of FIGS. 4*a* and 4*b*. Block 450 includes initial deployment of software at the host 400, such as the program 402 which includes the data aggregating component 402, the data analysis component 406 and the visual output component 408. Block 452 includes initial deployment of software at the database server 440, including the database access component 444. In one approach, initial deployment of software can be made manually based on user commands. However, it is also possible to automate the initial deployment of the software. At block 454, the host 400 provides a request to the manager 425 to execute the data aggregating component 404 and the data analysis component 406. In this example, two options follow.

In one option, at block 456, the manager 425 evaluates the suitability of the host 400 and the database server 440 to execute the components. It selects the database server 440 to execute the data aggregating component 404, and the host 400 to execute the data analysis component 406. This decision may be based on various conditions, as mentioned previously. At block 458, the manager instructs the database server to obtain the data aggregating component 442 from the host, and to report results to the host and/or to another computing device. At block 460, the database server obtains the data aggregating component from the host. At block 462, the database server executes the data aggregating component to provide aggregated data, and communicates the aggregated data to the host as a result. Optionally, once execution of the data aggregating component is completed, code for the component can be deleted. At block 464, the host executes the data analysis component 406 using the aggregated data to provide analyzed data. At block 466, the host executes the visual output component using the analyzed data to provide a display on the user interface 410.

In a second option which follows from block 454, at block 468, the manager 425 evaluates the suitability of the host 400 and the database server 440 to execute the components, and selects the database server 440 to execute both of these components. At block 470, the manager instructs the database server to obtain a copy of the data aggregating component 442 and a copy of the data analysis component from the host, and to report results to the host and/or to another computing device. At block 472, the database server obtains the components from the host. At block 474, the database server executes the data aggregating component to provide aggregated data, and, at block 476, executes the data analysis component using the aggregated data to provide analyzed data. Optionally, once execution of the data aggregating and data analysis components is completed, code for the components can be deleted. At block 478, the database server communicates the analyzed data to the host as a result. At block 480, the host executes the visual output component using the analyzed data to provide a display on the user interface 410.

The above discussion has illustrated moving code of a specific application. However, the code was not explained as being in a virtual compute/storage network. To provide a further illustration, examples are presented next in FIGS. 5a and 5b in which code is moved in a virtual compute/storage network.

Figure 5A:
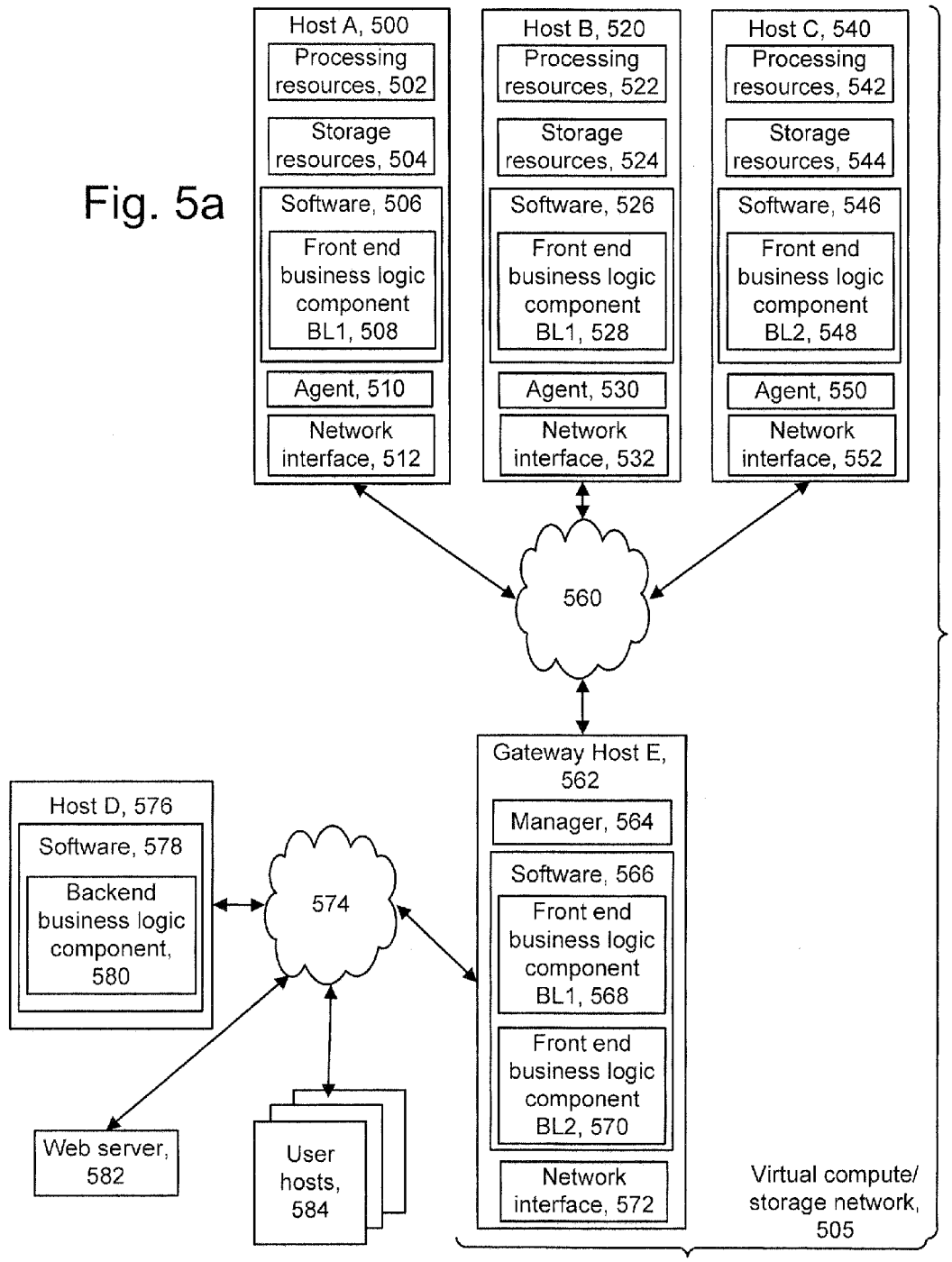
FIG. 5a depicts a system diagram of an eighth embodiment of a computing system in which a virtual compute/storage network has a first distribution of software components.
Figure 5B:
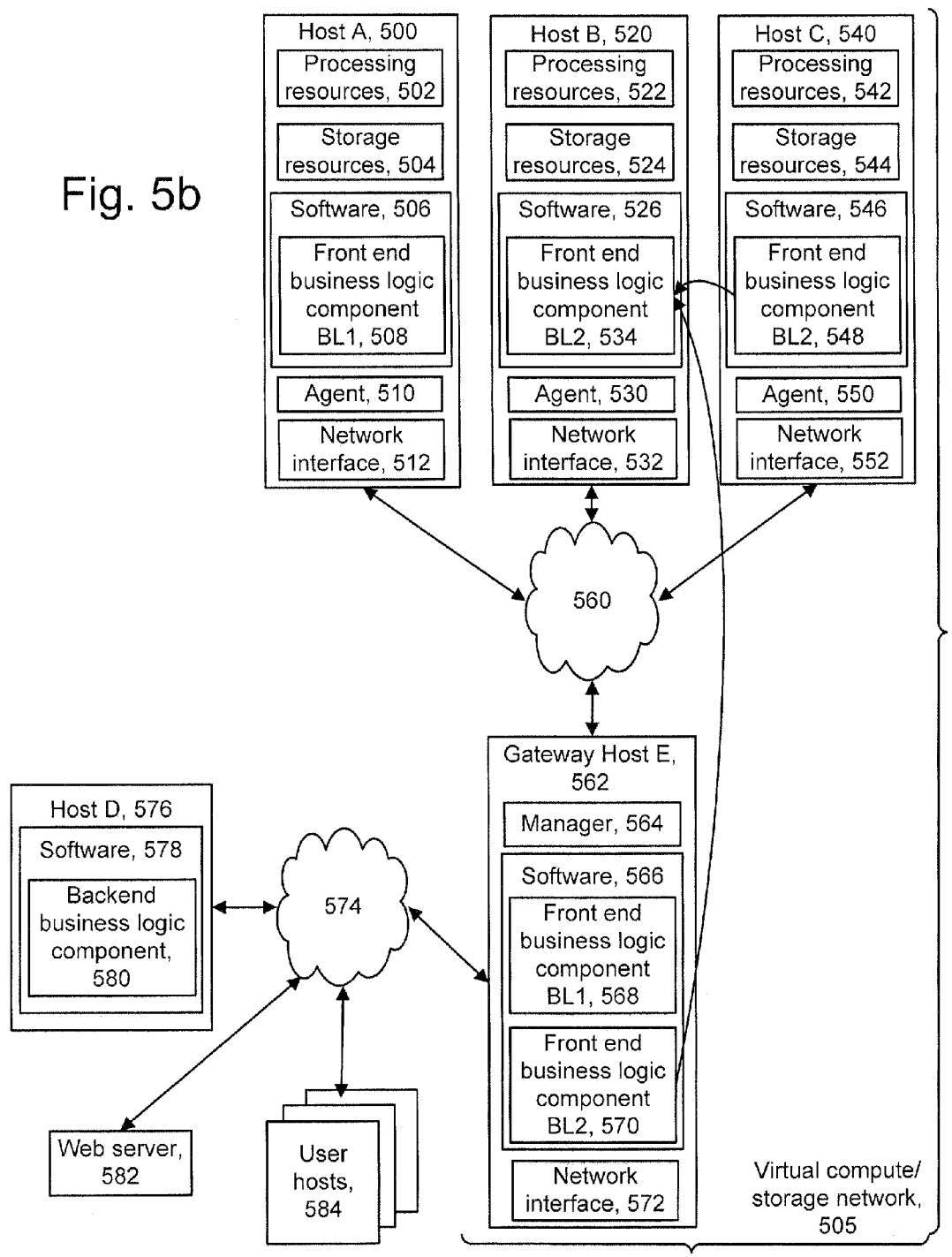
FIG. 5b depicts a system diagram of the computing system of FIG. 5a in which the virtual compute/storage network has a second distribution of software components.
Figure 5C:
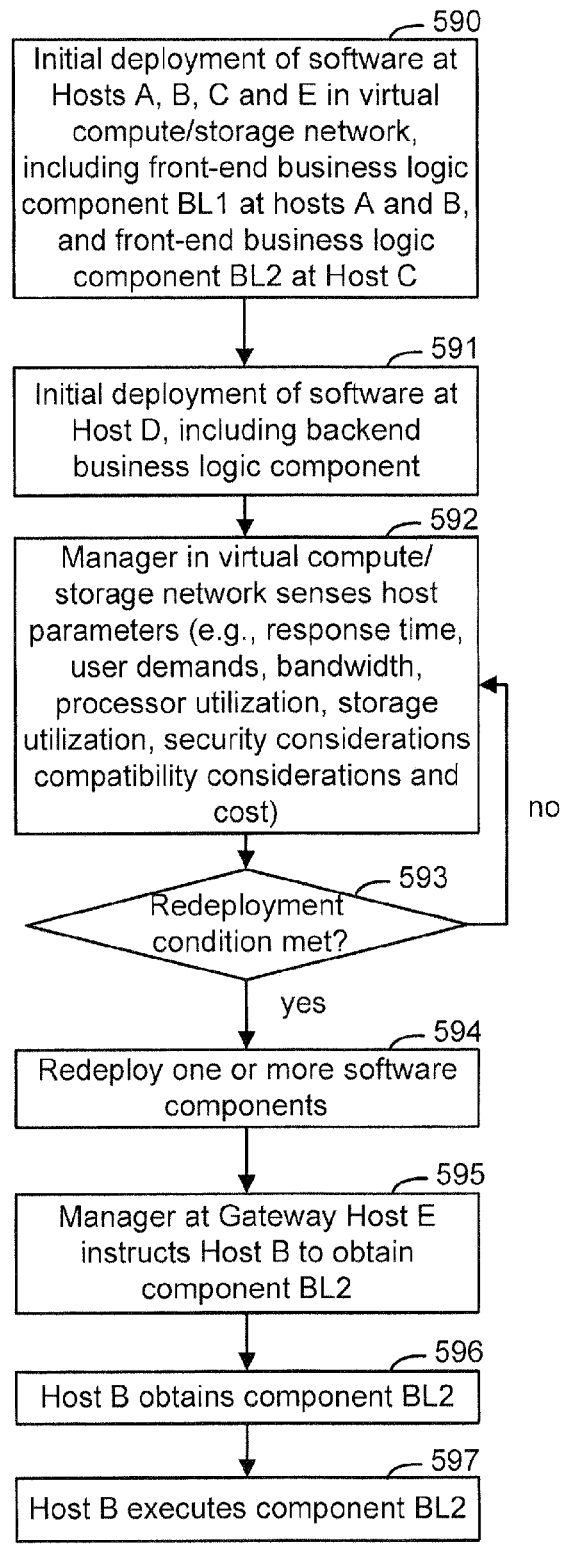
FIG. 5c depicts a flowchart of a process for managing movement and execution of software components, corresponding to the computing systems of FIGS. 5a and 5b.

FIGS. 5a and 5b provide another specific example, showing the redistribution of code in a virtual compute/storage network. FIG. 5c is a related flowchart.

Specifically, FIG. 5a depicts a system diagram of an eighth embodiment of a computing system in which a virtual compute/storage network has a first distribution of software components. A virtual computing/storage network can include a substantial amount of processing and storage resources which can be allocated as needed, in a transparent manner, as a service to a computing device outside the network, typically, but not always, via a web interface on the computing device. Data is permanently stored in servers in the virtual computing/storage network and cached temporarily on a client computing device such as when the computing device requests access to the data. Such networks allow resources to be quickly reallocated to respond to business demands. For example, an e-commerce retailer may request a first distribution of software to handle purchases which are made by users for different products. Based on sales or other factors, such as demographics and geographic location of customers, the retailer may wish to implement different business rules such as promotions, discounts, and offers, as well as modify its business rules to conform to local laws of the customers. For instance, a new product may be placed on sale which results in a large volume of user traffic to review and purchase the product. In this case, it is important to quickly provision additional computing devices with software for handling the load to avoid inconveniencing the user with delays and losing sales. Such software can include, e.g., a checkout component or a payment processing component. In another example, to stimulate sales, it may be desired to provision computing devices with business logic with software which implements cross-selling and upselling schemes.

In this example, Host A 500, Host B 520 and Host C 540 are three example hosts in a virtual compute/storage network 505 which includes a network communication medium or cloud 560. A Gateway Host E 562 is also provided which assigns the hosts to handle incoming requests. Host A 500 includes processing resources 502, storage resources 504, software 506, including a first type of business logic referred to as front end business logic BL1 508, an agent 510 and a network interface 512. Front end business logic is generally user-facing logic. Similarly, Host B 520 includes processing resources 522, storage resources 524, software 526, including another copy of the front end business logic BL1 528, an agent 530 and a network interface 532. Host C 540 includes processing resources 542, storage resources 544, software 546, including a second type of business logic referred to as front end business logic BL2 548, an agent 550 and a network interface 552. Gateway Host E 562 includes a manager 564, software 566, including a copy of the front end business logic BL1 568 and a copy of the front end business logic BL2 570, and a network interface 572. Gateway Host E 562 also includes its own processing and storage resources, not shown, but they are not allocated to entities outside the network 505. Further, the copies of the front end business logic BL1 568 and BL2 570 are stored but not executed at the Gateway Host E 562, in one possible approach.

Outside the virtual compute/storage network 505, a Host D 576 includes software 578, including a back end business logic component 580 which works with the front end business logic components BL1 and BL2. For example, the back end business logic component 580 may store data from the front end business logic components BL1 and BL2 for accounting and other purposes. One or more web servers 582 and user hosts 584 are also depicted. The user hosts 584 may access the virtual compute/storage network 505 via the one or more web servers 582 and the Gateway Host E 562, such as to purchase an item, for instance. One or more of the Hosts A, B and C are assigned to handle a transaction. A network medium 574 allows the Host D 576, one or more web servers 582, user hosts 584 and Gateway Host E 562 to communicate.

An example scenario for redistributing the software components among the Hosts A, B and C is as follows. Assume that Host C 540 experiences increasing traffic related to the front end business logic component BL2 548, and provides this information to the manager 564. For example, the traffic at Host C 540 may exceed a threshold. The manager 564 can respond by moving a copy of the front end business logic component BL2 534 to Host B, for example, as depicted in FIG. 5b, based on a determination that Host B has excess capacity, if its utilization is below a threshold. FIG. 5b depicts a system diagram of the computing system of FIG. 5a in which the virtual compute/storage network has a second distribution of software components. The front end business logic component BL1 528 at Host B may continue to execute or may be terminated. In another example, Host B may be a computing device which is newly made available via a network and does not run any business logic component before BL2 534 is provided to it.

A single instance or multiple instances of a component may execute in one or more threads. Also, while movement or reallocation of software within a virtual compute/storage network is depicted, it is also possible to move software between multiple virtual compute/storage networks, or between a virtual compute/storage network and an entity outside the virtual compute/storage network. For instance, a first virtual compute/storage network in a first geographic location such as London which handles user requests in that location can be reallocated to augment the capabilities of a second virtual compute/storage network in a second geographic location such as Sydney which handles user requests in that location. The techniques provided herein allow additional computing devices to be provisioned with software as demand grows, or to be decommissioned by removing software as demand falls, based on current, continuously updated assessments of user demand and market conditions. Business logic can thus be redistributed based on as business demands.

In another option, code which represents the front end business logic component BL2, for instance, could be created by a user at Host D 576, for instance, via a browser. For example, the code could be created using JAVASCRIPT and sent to the virtual compute/storage network 505 via the web server 582 and the Gateway Host E 562. The Gateway Host E 562 may be considered to be a centralized server which distributes the code to a computing device in the virtual compute/storage network 505 at which it is needed. Further details regarding redistribution of the software components are discussed next.

FIG. 5c depicts a flowchart of a process for managing movement and execution of software components, corresponding to the computing systems of FIGS. 5a and 5b. At block 590, initial deployment of software occurs for Hosts A, B, C and E in the virtual computer/storage network, including deployment of front-end business logic component BL1 at hosts A and B, and front-end business logic component BL2 at Host C. Gateway Host E may also store copies of the front-end business logic component BL1 and BL2. At block 591, initial deployment of software at Host D, including the backend business logic component, occurs. At block 592, the manager in the virtual computer/storage network senses host parameters, such as response time, user demands, bandwidth, processor utilization, storage utilization, security considerations, compatibility considerations and cost. At decision block 593, a determination is made as to whether one or more redeployment conditions are met. For example, this may include one or more of the host parameters crossing a threshold value. For instance, the manager may determine that a processor utilization of Host C has exceeded a threshold, indicating that Host C is becoming overloaded with user requests. Or, Host C may make this determination itself. The manager may also determine that Host B has a relatively low processor utilization, e.g., below a threshold, and is therefore able to handle part of the load of Host C.

Block 594 includes redeploying one or more software components, such as by deploying a copy of the front-end business logic component BL1 534 to Host B. Block 595 includes the manager at the Gateway Host E instructing Host B to obtain a copy of the front-end business logic component BL2 534 from Host C. In another possible approach, the manager could instruct Host C to distribute the copy of the front-end business logic component BL2 534 to Host B. At block 596, Host B obtains component BL2 and, at block 597, Host B begins executing component BL2.

Generally, components of a program can be moved at different points in time and to different computing machines based on current needs of a computing system. Thus, there is no need to move software to a computing system and store it there before it is needed. Moreover, once software is no longer needed at a computing system, it can be deleted and left for a garbage collection process.

The above discussions have illustrated moving code in a database accessing application and in a virtual compute/storage network. However, these examples did not explain moving both code and data in a specific application such as an image processing application. To provide a further illustration, examples are presented next in FIGS. 6a and 6b in which code and data are moved in an image processing application.

Figure 6A:
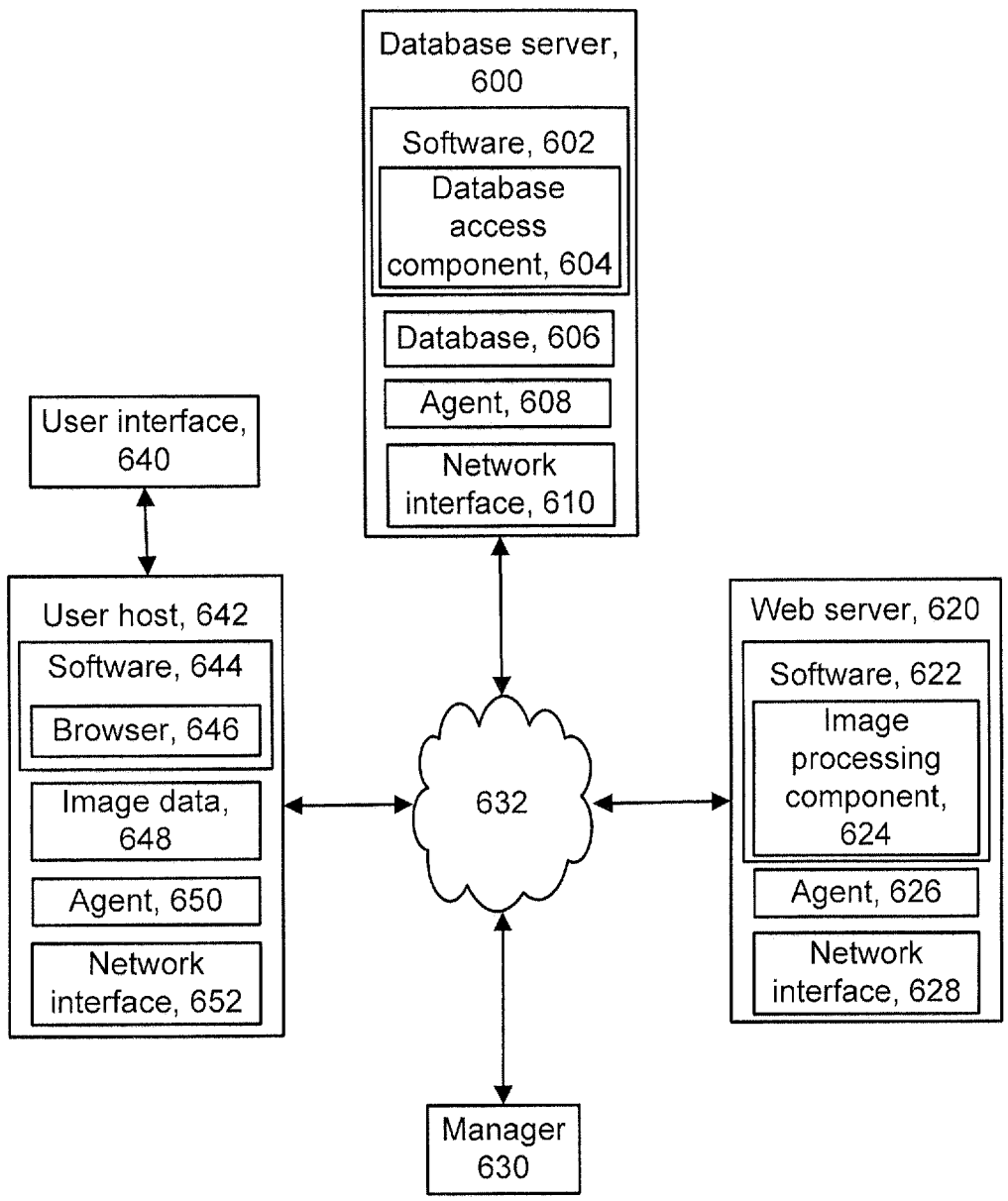
FIG. 6a depicts a system diagram of a ninth embodiment, in which a computing system has an example first distribution of image processing components and image data at a user host, web server and database server.
Figure 6B:
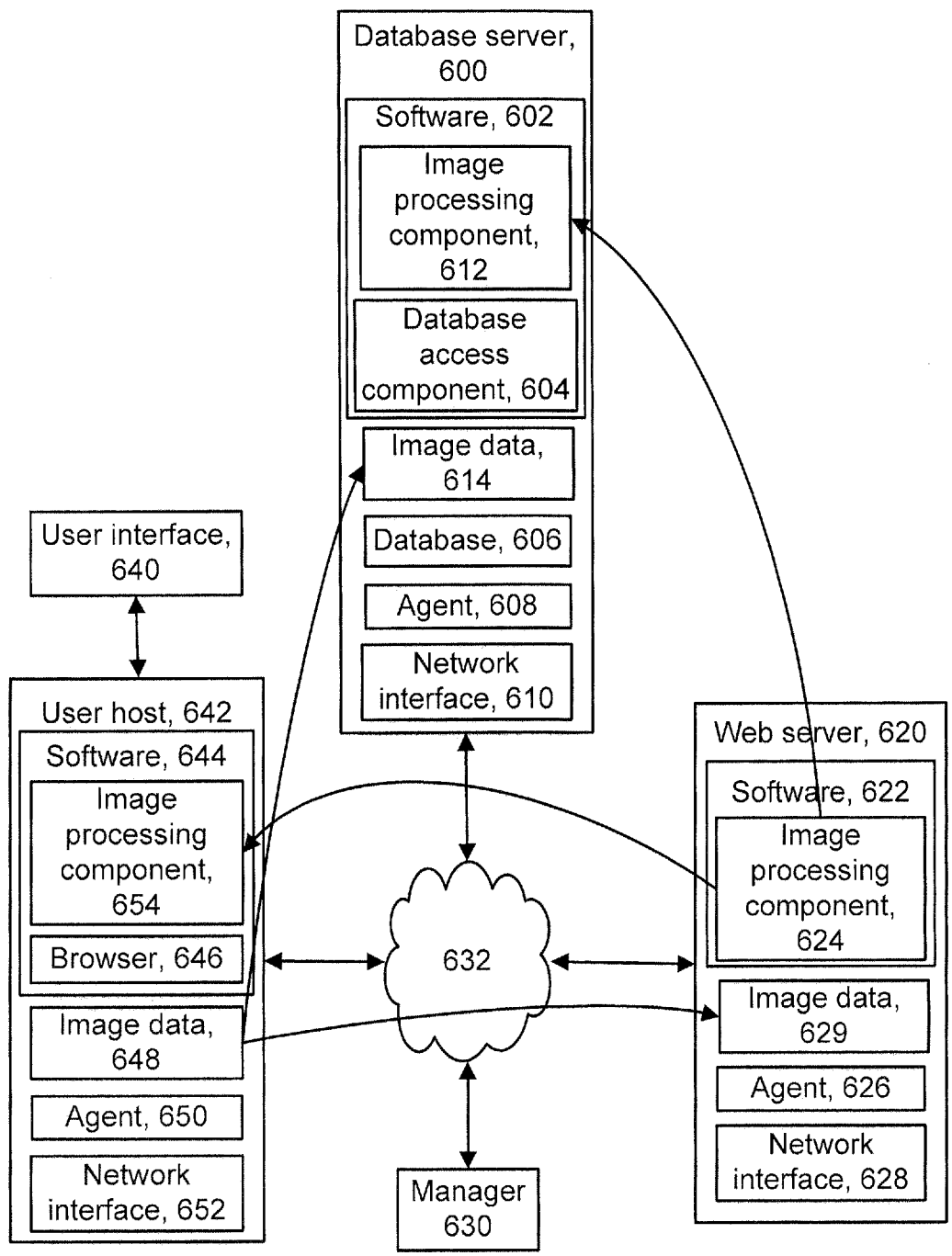
FIG. 6b depicts a system diagram of the computing system of FIG. 6a, showing an example second distribution of image processing components and image data at a user host, web server and database server.

FIGS. 6a and 6b provide another specific example, showing the movement of code and data in an image processing application. FIGS. 6c-6e are related flowcharts.

Specifically, FIG. 6a depicts a system diagram of a ninth embodiment, in which a computing system has an example first distribution of image processing components and image data at a user host, web server and database server. In this example, a user interface 640 communicates with a user host 642, which includes software 644, including a browser 646, image data 648, such as digital photos and/or videos, an agent 650 and a network interface 652. A web server 620 may provide a web site which allows users to upload images to be stored, shared with other users and/or to order prints, DVDs or other items, for instance. The web server 620 includes software 622, including an image processing component 624, an agent 626 and a network interface 628. Further, a database server 600 may communicate with the web server 620 such as to store and retrieve image data. The database server 600 includes software 602, including a database access component 604, a database 606, an agent 608 and a network interface 610. A manager 630 is also provided to manage the movement and execution of software in the computing system via a network medium 632.

In an example scenario, a user at the user host 642 seeks to process the image data 648 such as to change the format of the data. The image processing component 624, which is initially at the web server 620, is needed to change the format, e.g., by performing cropping, recompression, rotation or other operations. Various options are possible regarding movement of code and data to perform this task.

FIG. 6b depicts a system diagram of the computing system of FIG. 6a, showing an example second distribution of image processing components and image data at a user host, web server and database server. One option is to send a copy of the image data 629 from the user host to the web server, and to execute the image processing component 624 using the local copy of the image data 629 at the web server. Another option is to send a copy of the image processing component 654 from the web server to the user host, and to execute the image processing component 654 using the local copy of the image data 648 at the user host. Yet another option is to send a copy of the image processing component 612 from the web server to the database server 600, and to send a copy of the image data 614 from the user host to the database server, either directly or via the web server, and to execute the image processing component 612 using the local copy of the image data 614 at the database server. The determination of where to move and execute the software and data can be made by the manager 630 based on one or more conditions as discussed previously.

For example, if the processing of the image data, e.g., to change its format, results in a significantly smaller amount of data, it may be desirable to execute the image processing component at the user host 642 so that the amount of data to subsequently upload to the web server 620 is reduced. Another factor can be a response time between the user host and the web server. The user host can send a test request message to the web server, calculate the time to receive a response, and provide the result to the manager 630. If the response time is slow, this also tends to indicate that processing should be performed at the user host. Also, if the user host has a low CPU utilization and the web server has a high utilization, this also tends to indicate that the image processing component should be executed at the user host, e.g., at the browser 646. Moving processing tasks to the user host 642 can be advantageous as its processing resources are often under utilized while a web server is often kept very busy, sometimes due to a small number of high volume users.

On the other hand, if the user host has a high CPU utilization and the web server has a lower utilization, it may be desired to move the image data to the web server and execute the image processing component at the web server. Or, if the user host and the web server both have a high CPU utilization and the database server has a lower utilization, it may be desired to move the image data and the image processing component to the database server for execution there. Or, security considerations may prevent moving the image processing component to the host, in which case the candidate computing devices for running the mage processing component are the web server and the database server, but not the host. Some of the different scenarios are discussed in further detail below.

Note that if the image processing component 624 was initially present at the user host 642, a different scenario could occur. For instance, in response to a corresponding command by the user, the agent 650 could contact the manager 630 to determine if the processing should occur locally or elsewhere such as at the web server 620. If the manager decided that the processing should occur locally at the host 642, it would instruct the host to perform the processing using the image processing component. If the manager decided that the processing should occur locally at the web server 620, it would instruct the host 642 to communicate the data to the web server so that the processing using the image processing component occurs at the web server. If the manager decided that the processing should occur at the database server 600, it would instruct the host 642 to communicate the data to the database server 600 typically via the web server 620 so that the processing using the image processing component occurs at the database server.

FIG. 6c depicts a flowchart of a process for managing movement and execution of image processing components and image data, corresponding to a first distribution of components in the computing systems of FIGS. 6a and 6b. Initially, software is deployed at the user host, including a browser. Software is also deployed at the web server, including the image processing component and at the database server, including the database access component.

At block 660, the user provides a request to perform the image processing task to the manager. At block 661, the manager selects the user host to perform the image processing task. At block 662, the manager instructs the host to download a copy of the image processing component from the web server, such as by providing a URL to the host. At block 663, the host downloads the image processing component from the web server. At block 664, the image processing component executes at the user host on the local image data to provide processed image data. Optionally, once execution of the component is completed, code for the component can be deleted. At block 665, the user host uploads the processed image data to the web server. At block 666, the web server sends the processed image data to the database server and, at block 667, the database server stores the processed image data.

FIG. 6d depicts a flowchart of a process for managing movement and execution of image processing components and image data, corresponding to a second distribution of components in the computing systems of FIGS. 6a and 6b. At block 670, the user provides a request to perform the image processing task to the manager. At block 671, the manager selects the web server to perform the image processing task. For instance, the user host may be a cell phone or other portable computing device with limited processing and storage resources, which access the network 632 via a relatively low bandwidth connection, in which case moving the image processing component to the cell phone and executing it there may be undesirable compared to other options. This approach advantageously allows the user of the cell phone or other computing device to access the image processing functions which it could not otherwise access. The image processing functions are accessed via another computing device which is more suited to the task.

At block 672, the manager instructs the user host to upload the unprocessed image data to the web server. At block 673, the image processing component executes at the web server on the local image data to provide processed image data. At block 674, the web server sends the processed image data to the database server and, at block 675, the database server stores the processed image data.

FIG. 6e depicts a flowchart of a process for managing movement and execution of image processing components and image data, corresponding to a third distribution of components in the computing systems of FIGS. 6a and 6b. At block 680, the user provides a request to perform the image processing task to the manager. At block 681, the manager selects the database server to perform the image processing task. At block 682, the manager instructs the web server to provide the image processing component to the database server. At block 683, the manager instructs the user host to upload the unprocessed image data to the web server. At block 684, the manager instructs the web server to provide the unprocessed image data to the database server. At block 685, the image processing component executes at the database server on the local image data to provide processed image data. Optionally, once execution of the component is completed, code for the component can be deleted. At block 686, the database server stores the processed image data.

The above discussions have illustrated moving code in a database accessing application and in a virtual compute/storage network, and moving code and data in an image processing application. However, the examples did not explain moving code in an email application. To provide a further illustration, examples are presented next in FIGS. 7a and 7b in which code is moved in an email application.

Figure 7A:
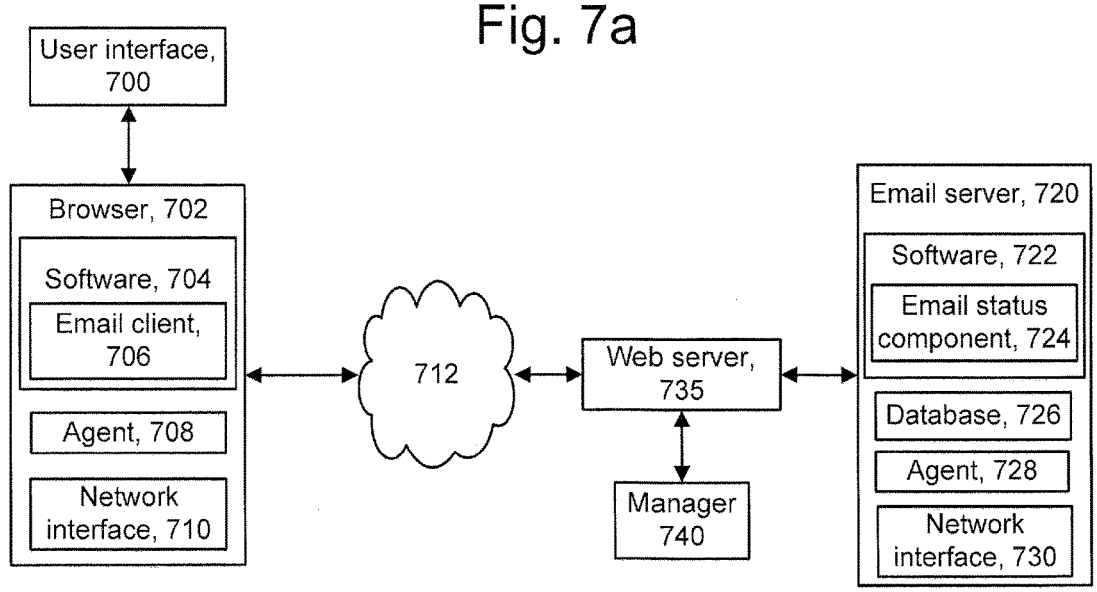
FIG. 7a depicts a system diagram of a tenth embodiment, in which a computing system has a user host with an email client.
Figure 7B:
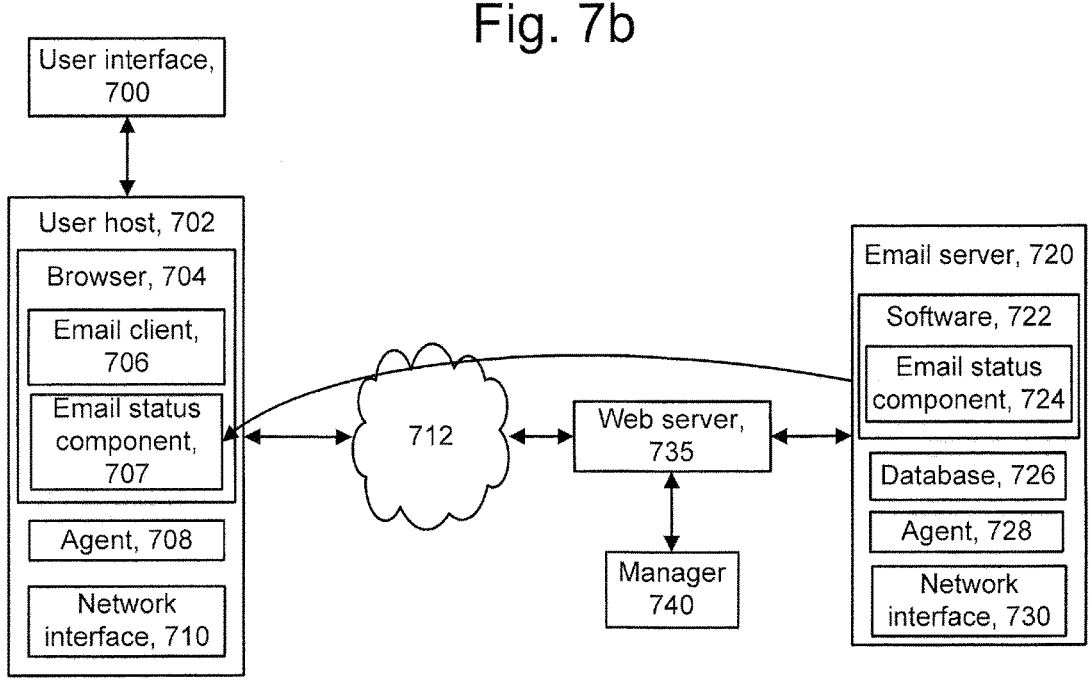

FIGS. 7a and 7b provide another specific example, showing the movement of code in an email application.

FIG. 7a depicts a system diagram of a seventh embodiment, in which a computing system has a user host with an email client. A user host 702, such as an email/web enabled cell phone, includes a browser 704, including an email client 706, an agent 708 and a network interface 710. An email server 720 includes software 722, including an email status component 724, an email database 726, an agent 728 and a network interface 730. The user host 702 communicates with the email server 720 via a web server 735 and a network 712, for instance. A manager 740 is also provided behind the web server 735, relative to the browser 702, in one possible approach. The email client 706 can be used to obtain data from the email server 720 for displaying a list of emails on the user interface 700, for instance. The email client 706 can display status information, such as the number of new emails, whether an email is from a contact, and so forth, which is provided by the email status component 724.

FIG. 7b depicts a system diagram of the computing system of FIG. 7a, in which a user host has an email client and an email status component, as an alternative to FIG. 7a. In one possible implementation, the email client 706 contacts the web server 735 when the email client is launched and provides compatibility data of the user host 702 and the browser 704. The web server, in turn, provides the data to the manager 740. For example, this may include a type of the user host and a type and version of the browser. Generally, when a web browser sends an HTTP request to an HTTP server, the client can identify itself using a User-Agent string such as:

User-Agent: Mozilla/4.0 (compatible; MSIE 5.01; Windows 98; YComp 5.0.0.0).

The manager 740 can examine the string and determine what software the browser can run. This string indicates that the browser is MOZILLA version 4.0, and that it is compatible with MICROSOFT INTERNET EXPLORER (MSIE) version 5.01, MICROSOFT WINDOWS 98, and YAHOO! companion (YComp) software for MSIE.

The manager 740 can maintain information regarding which software functions are supported on which browsers, for instance. The manager 740 can then determine if certain functions can be moved to the user host 702. For example, the manager 740 may determine that a copy of the email status component 707 can be provided to the user host 702, in which case the manager instructs the email server 720 to communicate the copy of the email status component 707 to the user host 702, or provide the user host 702 with information for contacting the email server 720 to obtain the copy of the email status component. When the email client 706 opens a list of emails, for example, the email status component 707 can execute and perform a task such as determining whether each email is new, and incrementing a counter of new emails accordingly. For example, each email may have a status identifier which indicates whether it is new, i.e., it has not been opened and read by the user. The email status component 707 can filter on the number of new emails and display the result on the user interface 700. This is a simple aggregation function of counting the number of new emails which can run at the user host. It can use a command which is similar to the SQL command COUNT(*), which returns the number of items in a group.

Accordingly, it can be seen that the techniques presented herein allow for optimal deployment of software and data in a computing system based on current conditions in the computing system, including current capabilities of different computing devices. Initial and subsequent deployments can be made based on an automatic assessment of a number of conditions. In one aspect, a manager receives a request to perform a software process which is not currently being performed, and automatically determines a computing device to execute the software process. The manager orchestrates moving code to the computing device to perform the software process, and initiates execution of the code. The manager can also manage the deployment of multiple components of a software process so that the components execute at different computing devices and communicate with one another.

The functionality described herein can be accomplished using hardware, software or a combination of both hardware and software. The software can be stored on one or more processor readable storage devices such as hard disk drives, CD-ROMs, DVDs, optical disks, floppy disks, tape drives, RAM, ROM, flash memory or other suitable storage device(s). In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more storage devices, peripherals and/or communication interfaces.

The foregoing detailed description of the invention has been presented for purposes of illustration and description. It is not intended to be exhaustive or to limit the invention to the precise form disclosed. Many modifications and variations are possible in light of the above teaching. The described embodiments were chosen to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computing device, comprising:
 a processor; and
 memory including instructions that, upon being executed by the processor, cause the computing device to:
  obtain a request to perform a process requiring access to data from a remote data store;
  determine a plurality of candidate computing devices that are individually configured to perform the process at least at a performance threshold;
  determine a first computing device from the plurality of candidate computing devices to execute the process based at least in part upon a rank of each of the plurality of candidate computing devices to execute the process, the rank of each of the plurality of candidate computing devices to execute the process based at least in part on a validation of security characteristics associated with each of the candidate computing devices, wherein a first security characteristic in the validation requires no user intervention and ranks over a second security characteristic in the validation that requires the user intervention, and wherein the user intervention corresponds to a user action that authorizes one or more of the candidate computing devices to execute the process after the request is obtained;
  determine that the first computing device is ranked as corresponding to the first security characteristic;
  cause the data to be obtained by the first computing device using a network location; and
  cause the first computing device to obtain and execute code to perform the process.

2. The computing device of claim 1, wherein the instructions upon being executed further cause the computing device to:
 monitor the first computing device as the first computing device executes the code to perform the process;
 determine that the first computing device is performing the process below the performance threshold;
 cause the code to perform the process to be redeployed to a second computing device;
 cause at least a portion of the data to be communicated from the first computing device to the second computing device; and
 cause the second selected computing device to execute the code to perform the process.

3. The computing device of claim 1, wherein the instructions upon being executed to cause the computing device to determine the first computing device include causing the computing device to:
 evaluate each of the plurality of candidate computing devices based at least in part on respective user demand of each of the plurality of candidate computing devices.

4. The computing device of claim 1, wherein the instructions upon being executed to cause the computing device to determine the first computing device include causing the computing device to:
 evaluate each of the plurality of candidate computing devices based at least in part on a respective security level of each of the plurality of candidate computing devices.

5. The computing device of claim 1, wherein the instructions upon being executed to cause the computing device to determine the first computing device include causing the computing device to:
  evaluate each of the plurality of candidate computing devices based at least in part on a respective monetary cost of each of the plurality of candidate computing devices to perform the process.

6. The computing device of claim 1, wherein the instructions upon being executed to cause the computing device to determine the first computing device include causing the computing device to:
  evaluate each of the plurality of candidate computing devices based at least in part on a respective response time of each of the plurality of candidate computing devices.

7. The computing device of claim 1, wherein the instructions upon being executed to cause the data to be obtained by the first computing device includes causing the computing device to:
  send second instructions to the first computing device to fetch the data from the remote data store using the network location.

8. The computing device of claim 1, wherein the instructions upon being executed to cause the data to be obtained by the first computing device includes causing the computing device to:
  send second instructions to a second computing device located at the network location to fetch the data from the remote data store and send the data to the first computing device.

9. The computing device of claim 1, wherein the instructions upon being executed to cause the first computing device to obtain the code includes causing the computing device to:
  send second instructions to the first computing device to fetch the code from the network location or a second network location.

10. The computing device of claim 1, wherein the instructions upon being executed to cause the first computing device to obtain the code includes causing the computing device to:
  send second instructions to a second computing device located at the network location or a second network location to fetch the code and send the code to the first computing device.

11. The computing device of claim 1, wherein the plurality of candidate computing devices includes a second computing device associated with the request to perform the process.

12. A computer-implemented method for managing a process, comprising:
  obtaining a request to perform a process requiring access to data from a remote data store;
  determining a plurality of candidate computing devices that are individually configured to perform the process at least at a performance threshold;
  determining a first computing device from the plurality of candidate computing devices to execute the process based at least in part upon a rank of each of the plurality of candidate computing devices to execute the process, the rank of each of the plurality of candidate computing devices to execute the process based at least in part on a validation of security characteristics associated with each of the candidate computing devices, wherein a first security characteristic in the validation requires no user intervention and ranks over a second security characteristic in the validation that requires the user intervention, and wherein the user intervention corresponds to a user action that authorizes one or more of the candidate computing devices to execute the process after the request is obtained;
  determining that the first computing device is ranked as corresponding to the first security characteristic;
  causing the data to be obtained by the first computing device using a network location; and
  causing the first computing device to obtain and execute code to perform the process.

13. The computer-implemented method of claim 12, further comprising:
  monitoring the first computing device as the first computing device executes the code to perform the process;
  determining that the first computing device is performing the process below the performance threshold;
  causing the code to perform the process to be redeployed to a second computing device;
  causing at least a portion of the data to be communicated from the first computing device to the second computing device; and
  causing the second selected computing device to execute the code to perform the process.

14. The computer-implemented method of claim 12, wherein determining the first computing device includes:
  evaluating each of the plurality of candidate computing devices based at least in part on one of respective networking bandwidth, respective processor resource utilization, or respective storage resource utilization of each of the plurality of candidate computing devices.

15. The computer-implemented method of claim 12, wherein determining the first computing device includes:
  evaluating each of the plurality of candidate computing devices based at least in part on respective compatibility of each of the plurality of candidate computing devices to perform the process.

16. The computer-implemented method of claim 12, wherein the code is compliant with an ECMA-262 standard.

17. The computer-implemented method of claim 12, wherein the plurality of candidate computing devices includes a plurality of virtual computing devices operating on one or more physical computing devices.

18. A non-transitory computer readable storage medium storing instructions for managing a process, the instructions, upon being executed by a processor, causing the processor to perform:
  obtain a request to perform a process requiring access to data from a remote data store;
  determine a plurality of candidate computing devices that are individually configured to perform the process at least at a performance threshold;
  determine a first computing device from the plurality of candidate computing devices to execute the process based at least in part upon a rank of each of the plurality of candidate computing devices to execute the process, the rank of each of the plurality of candidate computing devices to execute the process based at least in part on a validation of security characteristics associated with each of the candidate computing devices, wherein a first security characteristic in the validation requires no user intervention and ranks over a second security characteristic in the validation that requires the user intervention, and wherein the user intervention corresponds to a user action that authorizes one or more of the candidate computing devices to execute the process after the request is obtained;

determine that the first computing device is ranked as corresponding to the first security characteristic;

cause the data to be obtained by the first computing device using a network location; and cause the first computing device to obtain and execute code to perform the process.

19. The non-transitory computer readable storage medium of claim 18, wherein the instructions upon being executed to cause the data to be obtained by the first computing device include causing the processor to perform at least one of:

send second instructions to the first computing device to fetch the data from the remote data store using the network location; or send third instructions to a second computing device located at the network location to fetch the data from the remote data store and send the data to the first computing device.

20. The non-transitory computer readable storage medium of claim 18, wherein the instructions upon being executed to cause the first computing device to obtain the code include causing the processor to perform at least one of:

send second instructions to the first computing device to fetch the code from the network location or a second network location; or send third instructions to a second computing device located at the network location or a second network location to fetch the code and send the code to the first computing device.

* * * * *